United States Patent
Eiers et al.

(10) Patent No.: US 11,165,783 B1
(45) Date of Patent: Nov. 2, 2021

(54) QUANTIFYING PERMISSIVENESS OF ACCESS CONTROL POLICIES USING MODEL COUNTING TECHNIQUES AND AUTOMATED POLICY DOWNSCALING

(71) Applicant: Amazon Technologies, Inc., Seattle, WA (US)

(72) Inventors: William Joel Eiers, Carmichael, CA (US); Liana Sorina Hadarean, Sunnyvale, CA (US); Kasper Soe Luckow, Sunnyvale, CA (US); Neha Rungta, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 126 days.

(21) Appl. No.: 16/714,079

(22) Filed: Dec. 13, 2019

(51) Int. Cl.
*H04L 29/06* (2006.01)
*H04L 12/24* (2006.01)

(52) U.S. Cl.
CPC ........ *H04L 63/102* (2013.01); *H04L 41/0893* (2013.01); *H04L 63/0236* (2013.01); *H04L 63/0876* (2013.01); *H04L 63/20* (2013.01); *H04L 67/42* (2013.01)

(58) Field of Classification Search
CPC . H04L 63/0236; H04L 63/0876; H04L 63/20; H04L 63/102; H04L 67/42; H04L 41/0893
See application file for complete search history.

(56) References Cited

U.S. PATENT DOCUMENTS

| 10,834,135 | B1* | 11/2020 | Chhabra | H04L 63/20 |
| 2005/0028012 | A1* | 2/2005 | Amamiya | H04L 63/0209 726/4 |
| 2012/0042353 | A1* | 2/2012 | Tarkkala | G06F 21/53 726/1 |
| 2014/0359695 | A1* | 12/2014 | Chari | G06F 21/31 726/1 |

(Continued)

OTHER PUBLICATIONS

Vladimir Kolovski, James Hendler, and Bijan Parsia. 2007. Analyzing web access control policies. In Proceedings of the 16th international conference on World Wide Web (WWW '07). Association for Computing Machinery, New York, NY, USA, 677-686. (Year: 2007).*

(Continued)

*Primary Examiner* — John M Macilwinen
(74) *Attorney, Agent, or Firm* — Nicholson De Vos Webster & Elliott LLP

(57) ABSTRACT

Systems and methods for quantifying permissiveness of access control policies using model counting techniques and automated policy downscaling are disclosed. A policy service receives an initial access policy and transforms the access policy into an access constraint compatible with a constraint solver. The policy service determines a degree of permissiveness of the policy based on a number of distinct solutions to the access constraint identified by the constraint solver. Using data associated with access requests precisely allowed by the initial access policy and the initial access policy, the policy service generates a modified policy by adding additional constraints to the access policy and deter- (Continued)

mining that the modified policy is less permissive than the initial access policy.

20 Claims, 9 Drawing Sheets

(56) References Cited

U.S. PATENT DOCUMENTS

2020/0296139 A1* 9/2020 Fainberg .............. H04L 63/105

OTHER PUBLICATIONS

Kathi Fisler, Shriram Krishnamurthi, Leo A. Meyerovich, and Michael Carl Tschantz. Verification and change-impact analysis of access-control policies. In Proceedings of the 27th international conference on Software engineering (ICSE '05). 196-205. (Year: 2005).*
Liu, Alex & Chen, Fei & Hwang, Jeehyun & Xie, Tao. XEngine: a fast and scalable XACML policy evaluation engine. Sigmetrics Performance Evaluation Review—SIGMETRICS. 36. 265-276. (Year: 2008).*
Martin, Xie, & Yu. Defining and Measuring Policy Coverage in Testing Access Control Policies. International Conference on Information and Communications Security ICICS 2006: Information and Communications Security pp. 139-158. (Year: 2006).*

* cited by examiner

QUANTIFYING PERMISSIVENESS OF ACCESS CONTROL POLICIES USING MODEL COUNTING TECHNIQUES AND AUTOMATED POLICY DOWNSCALING

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual computing resources, such as virtual machines that appear and operate as independent computing devices to users of a data center. The single physical computing device can create, maintain, delete, or otherwise manage virtual resources in a dynamic manner. In some scenarios, various virtual machines may be associated with different combinations of operating systems or operating system configurations, virtualized hardware and networking resources, and software applications, to enable a physical computing device to provide different desired functionalities, or to provide similar functionalities more efficiently.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private "cloud" computing environment. A network of hardware computing devices can cooperatively use virtualization technologies to provide virtual computing resources and computing services to users of a computing resource service provider. Access to resources and data can be tightly controlled by a user account owner, an administrator, a group, a service, or the computing resource service provider itself; access can be based on many different parameters, such as user credentials, resource attributes, network configurations, and the like.

The provision of virtual computing resources as discrete instances configured for use as if they were typical data center hardware components, such as servers, disk storage, and network adapter cards, is known as infrastructure as a service (IaaS). An IaaS provider can also provide backend computing architecture implementing computing resources and services for, among other things, billing and account management, networking support such as monitoring and load balancing, security, backup and redundancy, and resource configurations and interoperability frameworks. A user can invoke these resources and services to create workflows, automate tasks, monitor and update deployed infrastructure, and otherwise manage its computing resources. An IaaS framework can enable a user to manage its infrastructure programmatically, a concept known as infrastructure as code (IaC). The "code" in IaC is machine-readable instructions organized as discrete definitions for each infrastructure component; the provider's virtual resource management service executes the instructions to rapidly provision, configure, and deploy instances of a virtual computing resource. IaC automates infrastructure deployment and combats configuration drift by conforming virtual resource instances to the corresponding definition.

Users of physical and virtual computing systems, including users of such systems provided by computing resource service providers (e.g., "cloud computing" providers) may deploy platforms to communicate with devices belonging to the user or to customers of the user. Such devices may include various "smart" devices such as appliances which relay information over the Internet for monitoring and other purposes. These devices may be capable of performing various actions such as writing data to remote datastores, reading data from remote datastores and other actions. Therefore, it is frequently desirable to control access to remote resources or limit other actions remote devices without the burden of creating individualized user names and passwords and access permissions for each device. One solution is the issuance of cryptographic certificates. A client device may store a serial number or other identifier and may also be provided access to a certificate. A client device may be authenticated (or authorized) by presenting the certificate to the platform. The platform may then allow or disallow certain actions based on the client identifier presented. Rather than specifying individualized permissions, the platform may read and implement a policy which describes actions allowed in terms of rules applied to access requests which may include times of day, inferred location of a client originating a request, client identifiers, and so on.

Services related to generating and deploying access control policies may be provided within the context such cloud computing and IaaS environments. A user may submit an access policy via a user interface to a computing resource service provider which implements the policy for resources operated on behalf on the user. Other services may also be offered in IaaS environment. For instance, development efforts in the field of theoretical computer science have produced software and software/hardware applications, known as "constraint solvers," that automatically solve complex logic problems. Such constraint solvers may be offered as services in IaaS environments.

A constraint solver can be used to prove or check the validity and/or satisfiability of logical formulae that define a solution to a constraint satisfaction problem presented to the constraint solver and expressed in a format known to the solver. Examples of constraint solvers include Boolean satisfiability problem (SAT) solvers, satisfiability modulo theories (SMT) solvers, and answer set programming (ASP) solvers. Executing a constraint solver requires significant computing power and memory. A constraint solver can have a set of features that each may be enabled or disabled, and may accept further configuration of functionality, in order to optimize the processing of certain kinds of problems presented as "queries" to the solver. Further, different constraint solvers of a given type may have different strengths and weaknesses with respect to processing logic problems. It is difficult to predict the runtime of a query on any particular solver configuration: the runtime can vary by orders of magnitude (e.g., from seconds to hours or even days) depending on the selection of a solver, its enabled features, the logical theories it uses, and other changes.

BRIEF DESCRIPTION OF THE DRAWINGS

Various techniques will be described with reference to the drawings, in which.

DETAILED DESCRIPTION

Figure 1:
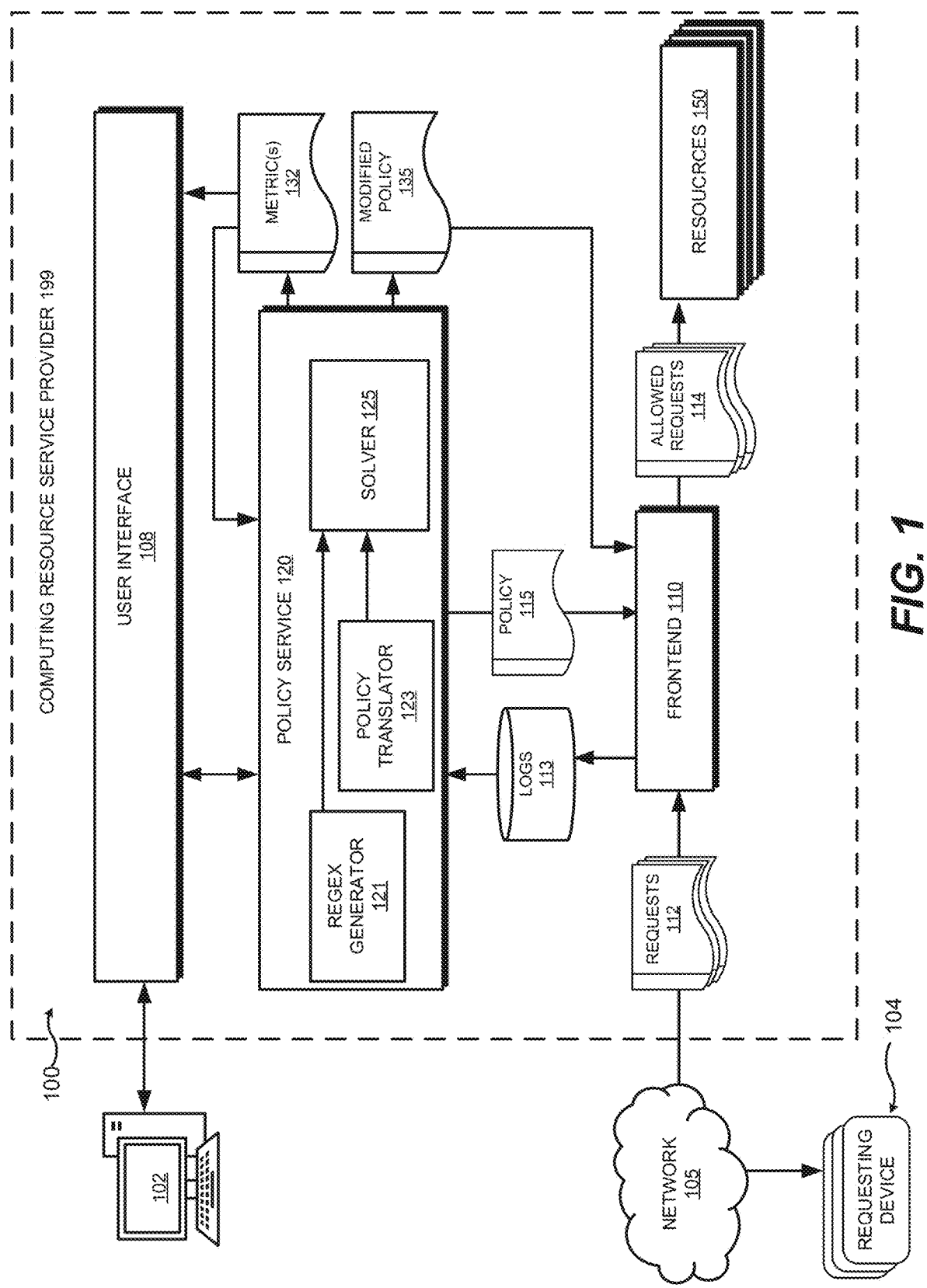
FIG. 1 is a block level diagram illustrating an example computing environment in which embodiments disclosed herein may be practiced.

In the context of a computing resource service provider, a client makes requests to have computing resources of the computing resource service provider allocated for the client's use. One or more services of the computing resource service provider receive the requests and allocate physical computing resources, such as usage of a computer processor, memory, storage drives, computer network interfaces, and other components of a hardware computing device, to the client. In some computing systems, a virtualization layer of the computing system generates instances of "virtual" computing resources that represent the allocated portion of corresponding physical computing resources. In this infrastructure as a service (IaaS) environment, the client may operate and control, as its own computing infrastructure, instances of virtual computing resources, including without limitation: virtual machine instances each emulating a complete computing device having an operating system, processing capabilities, storage capacity, and network connections; virtual machine instances or other containers for performing specific processes; virtual network interfaces each enabling one or more virtual machine instances to use an underlying network interface controller in isolation from each other; virtual datastores operating like hard drives or databases; and the like. The computing resource service provider may provision the virtual computing resources to the client in the client's own virtual computing environment(s), which can be communicatively isolated (or restricted, e.g., via security policies) from the environments of other clients. The computing resource service provider may allow the client to configure its virtual computing resources, so they can receive connections from the computing devices of end users; the client's virtual computing resources can provide software applications, web services, and other computing services to the end users.

One or more services of the computing resource service provider may, as described further below, be responsible for allocating a virtual computing resource, configuring the virtual computing resource, and deploying the virtual computing resource into the client's virtual computing environment. An IaaS environment that implements infrastructure as code (IaC) concepts enables this resource management service to obtain a resource definition comprising program code, and interpret and execute the resource definition to identify the resource type, allocate the appropriate virtualized physical resources for a virtual resource instance of the corresponding type, apply a defined configuration to the virtual resource instance, and deploy the virtual resource instance into the virtual computing environment. Virtual computing resources are deployed into a client's virtual computing environment by creating the instance within corresponding resources allocated to the environment and connecting the instance to other virtual computing resources and sometimes also to computing networks that interface with end user devices. In one implementation, the virtualization layer (e.g., containing one or more hypervisors) of the computing system generates one or more virtual networks within the environment, and a new instance receives an address (e.g., an IPv4 address) on the virtual network and can then communicate with other components on the virtual network. The virtual network may be attended by physical or virtual networking components such as network interfaces, firewalls, load balancers, and the like, which implement communication protocols, address spaces, and connections between components and to external communication networks (e.g., the internet and other wide-area networks). In various implementations, a client can configure various aspects of the virtual network and its attendant components.

A computing resource service provider may also provide certain services transparently on behalf of a user or client. In such instances, the computing resource service provider manage certain resources within its own computing environment in connection with virtualized resources over which the user is provided with direct access or control. In one example, a user supplies an access policy to the computing resource service provider which the computing resource service provider uses to control access to resources provided by or on behalf of the user. Client devices associated with the user or provisioned by the user may access physical and virtual resources belonging to the user in communication with systems of the computing resource service provider which enforce access control policies provided by or on behalf of the user. In an example, the user may use, sell or distribute internet-of-things (IoT) devices and provision them for use by customers or clients of the user. Rather than establish individualized credentials and permission for each of the devices (which may number in the hundreds, thousands, tens of thousands, hundreds of thousands, millions, or more), the user may provision the devices with shared credentials associated with the user such as a cryptographic certificate which may be authenticated using X.509 and other such protocols. Each client device may be authenticated using the shared credential and also supply a client identifier (or "ClientID") unique to that client. Access to the client's resources may be allowed for any authenticated client according to its client identifier and the access control policy. Because the number of client devices may be large and may not be known in advance, the access policy include regular expressions or similar expressions which allow entire ranges or classes of client identifiers to access particular resources and perform actions specified by the access control policy.

Because numerous clients may be authenticated using a single credential or a small number of credentials, security may be severely compromised if an authentication credential is compromised by an attacker. In such instances, a user may need to ensure that all devices using the compromised authentication credential are disabled, or otherwise reconfigured. This can be expensive and time-consuming and may result in interruption of service to a user's clients or purchasers of the user's products. It may therefore be desirable to estimate the potential security impact of such events for a given access control policy or set thereof. It may also be desirable to revise access policy to limit the potential impact of compromised credentials and other events.

The present disclosure provides systems and methods for quantifying permissiveness of access control policies using model counting techniques to quantify permissiveness of different access policies and provide automated policy downscaling within computing environments managing access to shared resources such as the environments shown in the Figures as non-limiting examples.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Referring to FIG. 1, embodiments of the present disclosure may operate within or upon computing systems of a computing resource service provider (e.g., computing resource service providers 199) accessible by a user 102 (represented by a user computing device) via a computer network 105 such as the Internet. The computing resource service provider 199 may provide various interfaces to users, such as the user 102 (representing by a user device) such as the user interface 108. The user interface 108 may be provided via websites, web applications, command consoles, and application programming interfaces (APIs) and the like, as described further below. The user 102 interacts via the user interface 108 with a policy service 120 operating within the computing environment 100 of the computing resource service provider 199. Access to various computing resources 150 controlled by the client 102 or provided on behalf of the client 102, may be provided by or mediated by the computing environment 100 of the computing resource service provider 199 according to an access policy 115 provided by the user 102 or on behalf of the user 102. IoT and other devices (e.g., the devices 104) may access the resources 150 as specified by the access policy 115. The policy service 120 is a service provided by the computing resource service provider 199 to assist users (e.g. the user 102) in analyzing properties of the access policy 115 such as "permisssiveness," which is discussed further below.

In general, the user 102 can access the user interface 108 via any computing device such as a desktop, laptop, mobile phone (or smartphone), tablet, kiosk, wireless device, and other electronic devices. Such computing devices may include web services running on the same or different data centers, where, for example, different web services may programmatically communicate with each other to perform one or more techniques described herein. The user interface 108 may be realized using one more approaches, including CLIs, APIs, and/or other programmatic interfaces.

A network 105 (e.g., the Internet) that connects a device of the user 102 to the computing resource service provider 199 may be any wired network, wireless network, or combination thereof. In addition, the network 105 may be a personal area network, local area network, wide area network, over-the-air broadcast network (e.g., for radio or television), cable network, satellite network, cellular telephone network, or combination thereof. In some embodiments, the network 105, may be a private or semi-private network, such as a corporate or university intranet. The network 105 may include one or more wireless networks, such as a Global System for Mobile Communications (GSM) network, a Code Division Multiple Access (CDMA) network, a Long Term Evolution (LTE) network, or any other type of wireless network. The network 105 can use protocols and components for communicating via the Internet or any of the other aforementioned types of networks. For example, the protocols used by the network 105 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user 102 may access the computing resource service provider 199 via a user interface 108, which may be any suitable user interface that is compatible with the computing device of the user 102 and the network 105, such as an API, a web application, web service, or other interface accessible by the computing device of the user 102 using a web browser or another software application, a command line interface, and the like. In some embodiments, the user interface 108 may include code and/or instructions for generating a graphic console on computing device of the user 102 using, for example, markup languages and other common web technologies. The user interface 108 may, via the computing device of the user 102, present a user with various options for configuring, requesting, launching, and otherwise operating functions provided by the policy service 120 to build and test software modules and may present a user with static, dynamic, and/or interactive content. User input (e.g., text, computer files, selected elements from a list or menu, mouse clicks on buttons, and other interactions) entered into the user interface 108 by the user 102 may be received and processed by the policy service 120 of the computing resource service provider 199, or by processes operating within the computing environment 100 or the computing resource service provider 199. For example a user 102 may use the user interface 108 to configure operation of the policy service 120 by selecting from configuration options displayed by the user interface 108. The user 102 may also use the user interface 108 to upload and download files to and from datastores provided within the environment 100. The user 102 may also use the user interface to view and interact reports generated by the policy service 120 and/or to view automatically generated policy recommendations and to implement those recommendations.

The policy service 120 is configured to receive access policies such as the access policy 115 which may be written specified in a human-readable format including XML, JSON, or any other suitable format as a non-limiting example. In some embodiments, the policy format may be provided by the computing resource service provider 199. The policy service 120 may include various functions or components, such as a regular expression generator (e.g., the regex generator 121), a policy translator 123, and a solver 125 which may be a constraint solver such as an SAT or SMT solver as described above. The policy service 120 may be configured to performed various functions including receiving an access policy (e.g., the policy 115) in a human-readable or other format, translating that policy into an access constraint (i.e., a set of predicate language statements that are satisfied by access requests allowed by the policy)

using the policy translator 123, determining a number of distinct solutions to the access constraint using the solver 125, and outputting a metric indicating a degree of permissiveness of the policy. As described below, the policy service 120 may be configured to intercept or access records of access requests (e.g., the access requests 112) processed by computing environment 100 that request access to resources 150 controlled by or on behalf of the user 102 which may be received over one or more networks 105 (e.g., the Internet, a WAN, a LAN, or other network) from client devices 104 such as IoT devices.

The client devices 104 may interact with a frontend 110. The frontend 110 may be an API, service, or other application provided by the computing resource service provider 199 or deployed by or on behalf of the user 102 in the environment 100 provided by the computing resource service provider 199. The client devices 104 may act as requesting devices transmitting access requests 112 to the frontend 110 which either allows the requested action(s) to be performed or prevents them from being performed based on the access policy 115. The frontend may store the access requests 112 or information derived therefrom in logs 113. The policy service 120 may be configured to use the access requests 112 (which may be retrieved from logs 113 or information associated therewith retrieved from logs 113) in the process of determining how permissive the policy 115 is and in generating a modified policy 135 that is less permissive than the policy 115, as described below.

Determining the "permissiveness" of the policy 115 may be desirable in many applications. As an example, the Applicant has discovered a new DOS type attack made possible by overly permissive policies that allow too many to initiate connections to resources (e.g., the resources 150) with a computing environment (e.g., the computing environment 100). If a large number client devices 104 use the same authentication credential (such as an X.509 certificate as one example), a compromised credential may allow an attacker to execute such a DOS attack by initiating a large number of connection requests using client identifiers which are allowed access by the policy 115. For example, enumerating each ClientID allowed to access the resources 150 in the policy 115 may be inefficient and require constant maintenance to account for the deployment of new client devices over time. Thus, the policy 115 may specify one or more expressions (e.g., a regular expression) or other rules for determining that a ClientID is allowed to access the resources 150. If those rules are overly-permissive, an effectively infinite number of ClientIDs may be allowed. As an example, a compromised authentication credential may allow an attacker to initiate millions of requests apparently originating from millions of randomly-generated ClientIDs which are allowed by the policy 115. It can therefore be useful to estimate the potential security impact of a compromised authentication credential by assessing how permissive a policy which may indicate how many actions the policy 115 may allow with respect to how many actions the policy needs to allow in order to allow requests from legitimate client devices 104.

The permissiveness of the policy 115 may be directly related to how many requests the policy allows. One frequently-used policy type simply determines whether an IoT device is allowed to initiate a connection based on a ClientID associated with the device. In this instance, the number of distinct requests allowed corresponds to the number of ClientIDs allowed by the policy 115. In order to determine that the policy 115 is overly permissive in this case, a way of determining that the policy 115 allows a high percentage of devices to connect is needed. In other words, it is necessary to determine the number of ClientIDs allowed by the policy relative to the total number of extant (or possible) ClientIDs. Given the policy 115, the simplest solution would be to evaluate the policy against all known ClientIDs assigned by the user 102 to client devices 104. However, this naïve approach has at least two deficiencies: (1) the number of client devices 104 may be large (e.g., in the millions), making evaluating the policy 115 against all ClientIDs computationally expensive and (2) the ClientIDs assigned by the user 102 can change over time, requiring the policy 115 to be constantly re-evaluated. Although these deficiencies can be mitigated by approximating the total number of allowed ClientIDs by evaluating the policy 115 against a sample of the total population of ClientIDs, this approach provides no formal guarantees that the estimated permissiveness is accurate and does not scale if multiple policies must be evaluated and as the number of ClientIDs increases. Thus, systems and methods disclosed herein utilize constrain solvers to provide measures of permissiveness (e.g., metrics 132) with the formal guarantee that estimates of permissiveness are based on finding every unique solution to an access constraint that correspondents to the policy 115.

In some embodiments, rather than using either of an exhaustive list of ClientIDs and a potentially-unrepresentative sample of ClientIDs to evaluate the policy 115, the policy service 120 intercepts or is supplied with ClientIDs belonging to a set of the requests 112 allowed by the policy 115. The policy service 120 may then use the regex generator 121 to generate a regular expression which matches all of the ClientIDs using one or more machine learning algorithms and/or other approaches. The total number of strings matching the regular expression can be used to approximate the total number of valid ClientIDs for purposes of evaluating the permissiveness of the policy 115.

Figure 2:
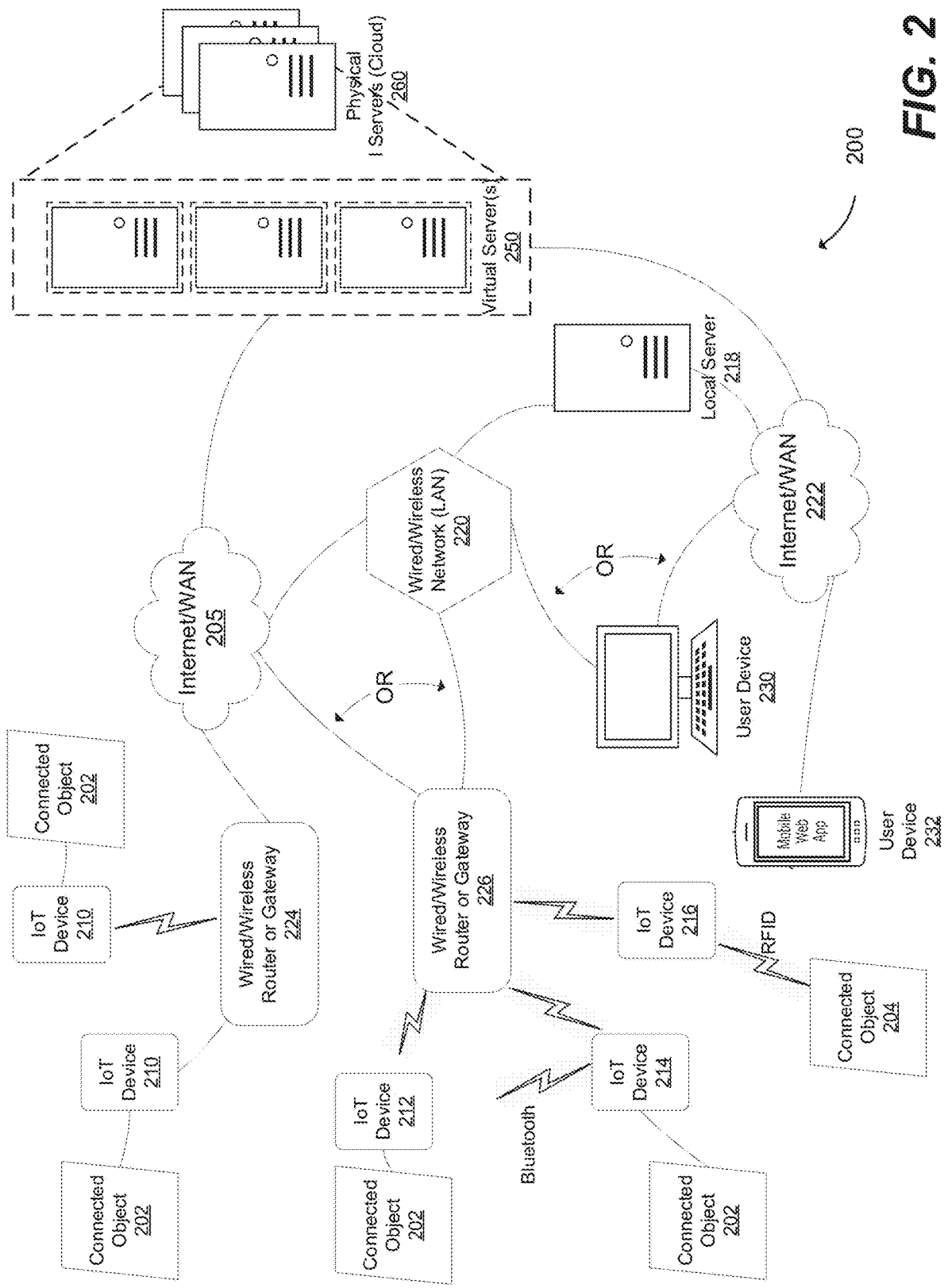
FIG. 2 is a diagram of an example computing environment for deploying Internet of Things (IoT) devices in which embodiments disclosed herein may be practiced.
Figure 3:
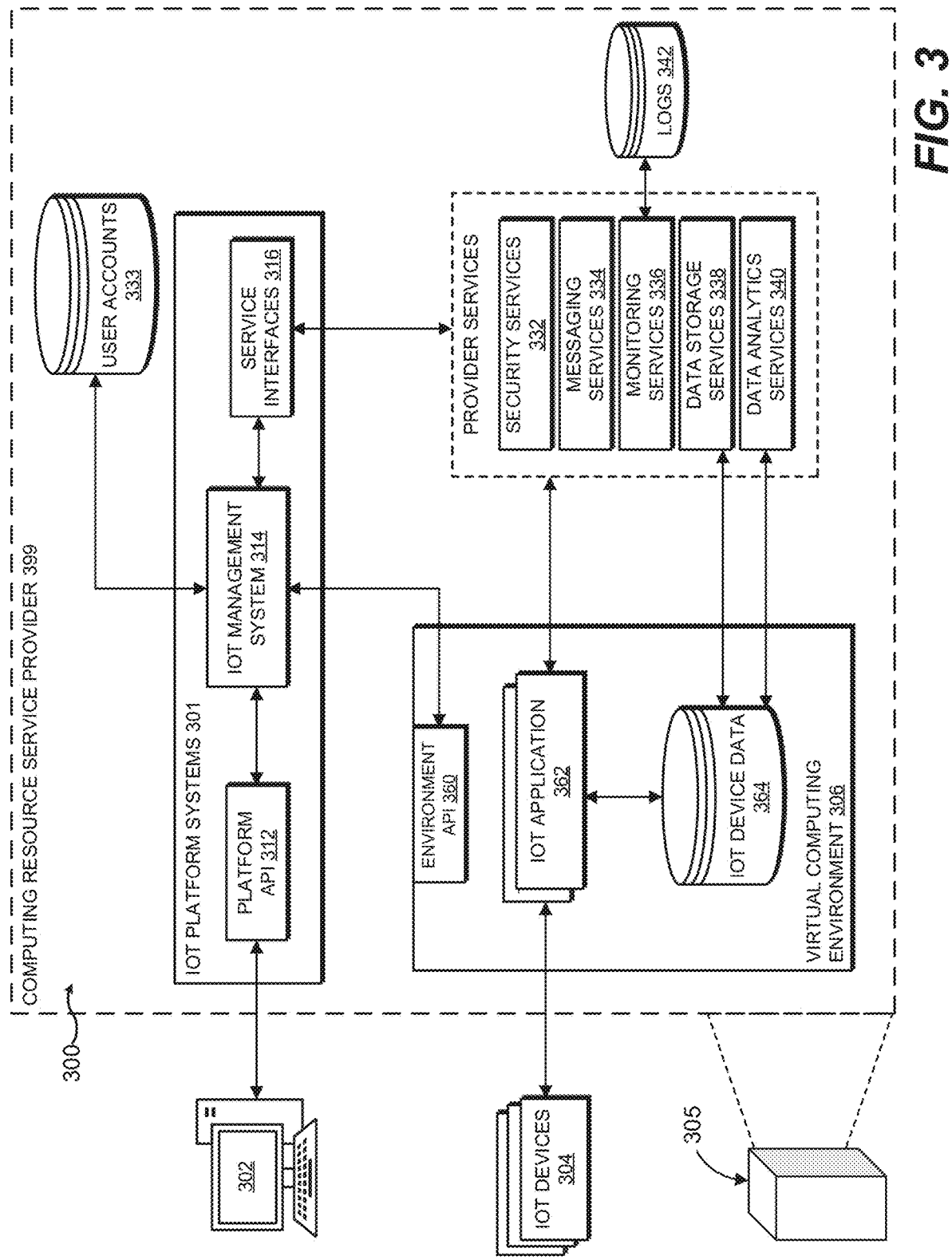
FIG. 3 is a block diagram of another example computing environment in which embodiments disclosed herein may be practiced.

The policy service 120 may also be configured to use the policy 115 and information about the requests 112 from the client device 104 processed by the computing environment 100 to automatically generate a modified policy 135 which allows the same requests 112 as the policy 115 with reduced overall permissiveness. The policy service 120 may use the solver 125 to formally verify that the modified policy 135 is less permissive than policy 115 while still allowing the same requests 112 as the policy 115. The policy service may display permissiveness and/or other metrics 132 to the user 102 via the user interface 108. The policy service 120 may prompt the user 120 to review the modified policy 135 in a human-readable format and issue instructions via the user interface 108 to the policy service 120 to adopt the modified policy 135 in place of the policy 115. Operation of the solver 125 and other features of the policy service 120 in certain embodiments is described further below in connection to FIG. 4, and FIGS. 5A,B. FIGS. 2-3, described below, illustrate elements of non-limiting example "cloud" environments in which the policy service 120 may operate.

Referring to FIG. 2, an example computing environment 200 for wired and/or wireless monitoring and control of electronic and mechanical devices that are deployed in a physical environment, such as a home or residential environment, a commercial building, a farm or other agricultural facility, industrial environments such as factories and refineries, and any other physical environment where it is feasible and beneficial to deploy so-called "smart" devices, which are natively or retroactively enabled to connect to the internet or another wide-area network (WAN) 222 to send and receive electronic data. In particular, such devices become "connected objects" 202, 204 in the computing environment 200 by interfacing with an internet enabled device, referred to herein as an "Internet-of-Things" (IoT) device, in accordance with various embodiments described herein. Other significant entities, such as a person, an animal (e.g., a farm animal), a pipe or pipeline, a body of water, or the physical environment itself, may become a connected object 202, 204 in the computing environment 200 by interfacing with an IoT device. The interface or connection between a connected object 202, 204 and an IoT device 210, 212, 214, 216 may depend on several factors, non-limiting examples of which include: whether the object is electronic, mechanical, organic, etc.; whether the object is "natively" connected, having the IoT device or another transmitter built-in, or the IoT device is added or connected to the object to make the object "connected;" whether the IoT device connects directly to the connected object, and/or connects to other objects or must be disposed in a particular location (e.g., to deploy a sensor); and, whether the IoT device sends data to the connected object, receives data from the connected object, or both. Example interfaces/connections are described below with respect to FIGS. 2 and 3.

Each of the IoT devices 210-216 may be embedded with electronics, software, sensors, actuators, and network connectivity, either within the device itself or in cooperation with connected servers 218, 260, which enable the IoT devices 210-216 and their embedded software to collect and exchange data. In some embodiments, various IoT devices 210-216 in an environment 200 may send and/or receive data transmissions over a WAN 222, a local area network (LAN) 220, and/or another communication network using any suitable communication protocol. For example, the IoT devices 212-216 may communicate over the LAN 220 with a local server computing device 218, such as in a private network where transmitted data to/from the IoT devices is isolated from the internet or another WAN 222, at least until the data is processed by the local server 218. In some embodiments, (a) local server(s) 218 may be operated at the same location as the IoT devices 212-216, such as at a residence or in an office building. A user device 230 may also be connected to the LAN 220 in order to access the IoT data as described below; alternatively, IP connectivity may be used, connecting the LAN 220 and/or the local server(s) 218 to the Internet or another WAN 222, so that local and/or remote user devices 230, 232 can access the local server 218.

In still other embodiments, IoT devices 210-216 may connect, directly or through a router, gateway, base station, etc. (shown as wired/wireless router or gateway 224, 226), to the WAN 222 in order to communicate with cloud-based computing resources. Such an environment provides a bi-directional, direct-to-cloud communication between the IoT devices 210-216 and one or more application and/or hosting servers. In some embodiments, IoT devices 210-216 may communicate with and directly use the resources of one or more physical, remote server computing devices 260, which may be deployed in one or more data centers (for example) in a particular geographic location or dispersed throughout several geographic locations. In other embodiments, the remote physical servers 260 may cooperate to provide virtualized computing resources that can be allocated for use by, for example, an authorized user of a computing resource service provider. Thus, a user that controls, or provides services for, the IoT devices 210-216 may configure and deploy one or more virtual servers 250 that are allocated the use of certain physical computing resources, such as processor cycles, memory, data storage, etc., of the physical servers 260; the IoT devices 210-216 may, in turn, be configured to connect to the virtual servers 250. For example, an IoT device 210 may be programmed to connect to an IP address associated with an endpoint that connects a virtual network adapter of the servers 250 to a physical network adapter of the physical servers 260. The virtual servers 250, or the computing resource service provider's computing environment in which the virtual servers 250 are deployed, may provide other computing resource services for implementing an IoT platform as described further below.

Given this bi-directional, cloud-based environment, each IoT device 210-216 may be deployed as a direct-to-cloud IoT device. In other words, the deployment of multiple IoT devices 210-216 in a LAN-based or cloud-based environment provides for an internetworking of physical devices, connected devices, and/or smart devices at the network level. Various communication protocols between components may be used, depending on the types of devices connecting to each other and the type, amount, and frequency of data being exchanged. Non-limiting examples of connection protocols include: an IoT device 210, such as a base station or fixture, may have a wired (e.g., CAT5, USB) connection to a router 224 and may use any TCP/IP protocol for wired connections; or, an IoT device 210 may have a wireless connection to a router 224, and may use wireless TCP/IP protocols such as Wi-Fi or MQTT; an IoT device 212 may communicate directly with another IoT device 214 using the above wireless protocols or other suitable protocols such as Bluetooth; IoT device 210-214 connections to a connected object 202 may be wired, or may be indirect based on a sensor interface; or, an IoT device 216 may connect wirelessly to the connected object 204, using a suitable protocol such as RFID for an RFID-enabled connected object 204. More generally, a communication network can include a Wi-Fi network (e.g., an 802.11x network, which can include one or more wireless routers, one or more switches, etc.), a peer-to-peer network (e.g., a Bluetooth® network, a ZigBee® network, a Z-Wave® network, a proprietary RF connection, etc.), a cellular network (e.g., a 3G network, a 4G network, etc., complying with any suitable standard, such as CDMA, GSM, LTE, LTE Advanced, etc.), a wired network, etc. In some embodiments, the communication network can be a LAN, a WAN, a public network (e.g., the Internet), a private or semi-private network (e.g., a corporate or university intranet), any other suitable type of network, or any suitable combination of networks. Communications links between the pressure switch 200, the router/modem 302, and the cloud based server 304, and/or the internet-enabled device 306 can each be any suitable communications link or combination of communications links, such as wired links, fiber optic links, Wi-Fi links, Bluetooth links, cellular links, etc.

A user may operate one or more client computing devices 230, such as a desktop or laptop computer, or a mobile computing device 232 such as a phone or tablet, running client software that enables the device 230, 232 to access an interface to the IoT platform provided by a server 218, 250, 260. Each of these client computing devices 230, 232 may include at least one processor executing specific computer-executable instructions (i.e., the running software) stored in a memory coupled to the client computing device. The user may access and run a client-based software such as a web browser or web application, in order to request access to the system level software and/or the GUI (e.g., by entering a Uniform Resource Locator (URL) for a web page including the GUI). This request may identify the IP address for the server(s), as well as instructions to generate and render the GUI and/or web page for the system level software. The server(s) may execute one or more software instructions to generate and render the GUI, and transmit it to the client computing device 230, 232 for display. The server(s) 218, 250, 260 may include components and data processing capabilities used to host and run software applications that allow for bi-directional communication between each IoT device 210-216 and the server(s). For example, the server(s) may host the customizable software that is deployed to, and installed on, each IoT device 210-216. The server(s) may also run the software and protocols for other services used by the IoT platform, as well as for the interface to the client computing devices 230, 232. Example uses of the user interface to the IoT platform include configuring and deploying server resources, configuring and deploying software and settings for IoT devices, obtaining and/or reviewing data collected by the server(s) from the IoT devices 210-216 (e.g., viewing current status), performing and/or reviewing data analysis, accessing particular IoT devices 210-216, etc.

Referring to FIG. 3, embodiments of the invention may operate within or upon computing systems (e.g., hardware computing device 304) of a computing resource service provider that provide a computing environment 300 accessible, via one or more computer networks, by users of user computing devices 302 and by one or more IoT devices 304 configured and deployed as described above. The computing environment 399 may, for example, be provided by the virtual servers 250 and/or the physical servers 260 of FIG. 2 (i.e., computing device 304 may be one of the physical servers 260 of FIG. 2). That is, where FIG. 2 illustrates the conceptual operation of the present systems and methods in interaction, via computing devices 230, 232, with a "client," or administrator of IoT devices 210-216 deployed in a computing environment 200, FIG. 3 illustrates a computing architecture in which a client may access the computing systems of the computing resource service provider environment 300 (e.g., using the client's user account credentials) using a computing device 302 to connect to one or more user interfaces provided (e.g., as websites, web applications, command consoles, APIs, etc.) in the environment 300; the user interfaces may enable the client to manage virtual computing resources allocated to the client's account and configured to implement an IoT platform for the client's IoT devices 304.

The computing resource service provider environment 300 may include one or more systems 301 that cooperate to enable deployment of the IoT platform using a customized configuration for a particular user. The systems 301 may include a platform API 312 to which the client, via user device 302, connects in order to configure, deploy, manage, and otherwise interact with the client's IoT platform. In some embodiments, the platform API 312 provides secure access to an IoT management system 314 that includes or accesses services and data needed to interact with an IoT platform, IoT application 362, and/or IoT devices 304 that are deployed within or connect to the client's virtual computing environment 306, described below. In some embodiments, the IoT management system 314 may access one or more user account data stores 322 that contain user account information and other private information associated with the client's user account. For example, the IoT management system 314 may store and retrieve configuration settings for particular IoT devices 304 and/or IoT applications 362 that the client has previously submitted.

The computing resource service provider implements, within its computing environment 300, at least one virtual computing environment 306 in which users may obtain virtual computing resources that enable the users to run programs, store, retrieve, and process data, access services of the computing resource service provider environment 300, etc. The virtual computing environment 306 may be one of any suitable type and/or configuration of a compute resource virtualization platform implemented on one or more physical computing devices. Non-limiting examples of virtual computing environments 306 include data centers, clusters of data centers organized into zones or regions, a public or private cloud environment, etc. The virtual computing environment 306 may be associated with and controlled and managed by the client. In some embodiments, the virtual computing environment 306 of a particular client may be dedicated to the client, and access thereto by any other user or service of the computing resource service provider environment 300 prohibited except in accordance with access permissions granted by the client. In some embodiments, an environment API 360 may serve as a front-end interface that provides access to the resources of the virtual computing environment 306 based on whether or not requests to access the environment 306 are authorized. For example, the IoT management system 314 may deploy IoT platform-related resources, push configuration changes, and request information about such resources via calls to the environment API 360. Additionally or alternatively, other channels, such as TLS-encrypted data channels, may be enabled to allow data to enter or exit the environment 306 without passing through the environment API 360. For example, an IoT application 362 in the environment 306 may be configured to communicate directly with IoT devices 304 and/or certain services in the computing resource service provider environment 300.

In some embodiments, a client's IoT platform may be deployed by installing one or more IoT applications 362 into the client's virtual computing environment 306. An IoT application 362 may be a software program or suite of software programs including program instructions that enable a processor executing the IoT application 362 to communicate with deployed IoT devices 304, sending and/or receiving data, processing data, and making decisions in accordance with the desired goals and functions of the IoT platform. For example, the IoT application 362 may cause the processor to receive sensor data from the IoT devices 304, process the data to determine whether to take any actions, and then perform any identified action such as reporting the status of connected objects to the client, sending new commands to one or more of the IoT devices 304, storing data (e.g., in an IoT device data store 364), etc. The IoT application may be executed within virtual computing resources allocated to the client's virtual computing environment 306, such as one or more virtual machine instances or logical container instances configured to provide virtualized physical computing resources for the purpose of performing the IoT application's functions. For example, a virtual machine instance may be launched from a software image including the configuration information (e.g., operating system, memory, disk storage, network interface configuration, and software program code) needed to provide an execution environment for the IoT application 362.

The computing resource service provider environment 300 may include data processing architecture that implements systems and services that operate "outside" of any particular user's virtual computing environment and perform various functions, such as managing communications to the virtual computing environments, providing electronic data storage, and performing security assessments and other data analysis functions. These systems and services may communicate with each other, with devices and services outside of the computing resource service provider environment 300, and/or with the virtual computing environments. Services depicted in the figures as inside a particular virtual computing environment 306 or outside all virtual computing environments may be suitably modified to operate in the data processing architecture in a different fashion than what is depicted. The IoT management system 314 may include or communicate with one or more service interfaces 316, such as APIs, that enable the IoT management system 314 and/or other components of a deployed IoT platform (e.g., an IoT application 362) to interact with one or more of these systems and services. Non-limiting examples of provider services that may be invoked or accessed to work in conjunction with the IoT platform include: security services 232 that maintain and apply security policies, access controls, and the like, encrypt and decrypt information, create secure transmission (e.g., TLS) channels, etc.; messaging services 234 that transmit triggering events and other notifications between subscribing users and services, and or/provide queueing services for prioritizing synchronous and asynchronous operations (e.g., API calls); monitoring services 236 that monitor network activity and computing resource usage and generate logs 242 of activity; data storage services 238 that maintain distributed storage devices, databases, etc., and that may maintain and/or obtain data stored in an IoT device data store 364; and, data analytics services 240 that may collect data (e.g., aggregated sensor data) and perform analytics on the data, such as machine learning, trend analysis, general monitoring/alerting, etc.

Figure 4:
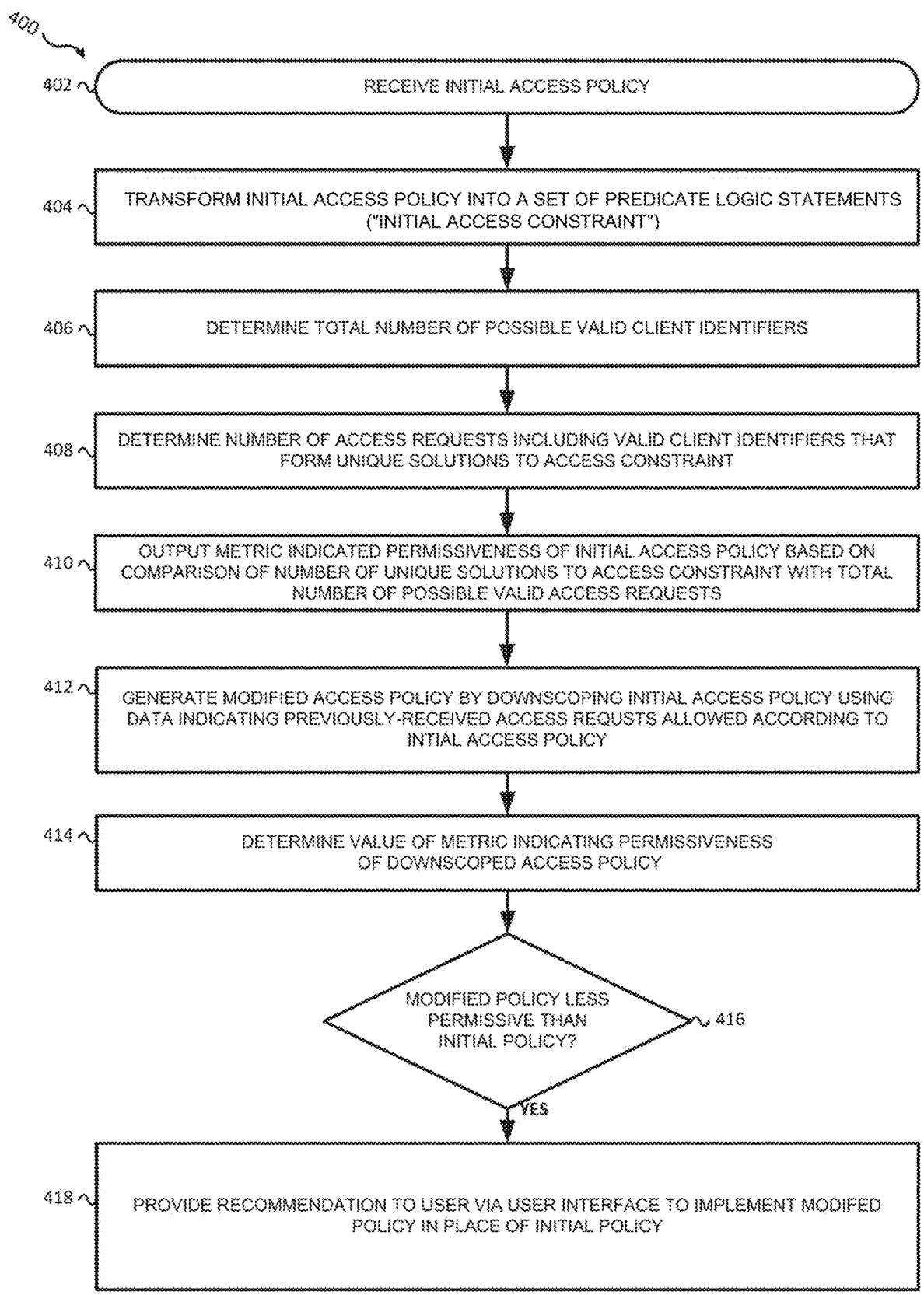
FIG. 4 is flowchart illustrating an example procedure performed in embodiments disclosed herein.

FIG. 4 shows an example procedure 400 performed by a system such as the policy solver 120 in certain embodiments. The procedure 400 contains the steps 402, 404, 406, 408, 410, 412, 414, 416, and 418. It should be understood that, in various embodiments, some, or all of the steps of the procedure 400 may be performed in the disclosed order or in various different orders and/or in combinations with other steps disclosed herein.

At step 402, the system receives an access policy (e.g., the policy 115). The access policy may be supplied in a human-readable format such as JSON, XML, or any other format, including program code and/or suitable machine-readable formats. The access policy may describe allowed actions and/or ClientIDs as illustrated by the following example policy consisting of a single "Statement" structure:
"Statement": [{
  "Condition": {
    "StringLike": {
      "iot:ClientId": "id*"},
    "Resource": [
      "arn:iot:client/${iot:ClientId}"],
    "Action": "iot:Connect",
    "Effect": "Allow"
}]

In this non-limiting example, an access policy is specified by one or more "Statement" structures which may allow a user such as the user 102 to specify conditions to apply to incoming access requests such as the access request 112 and functions or operations to use in evaluating those conditions. Requests matching the condition(s) are allowed to access resources such as the resources 150 by performing one or more actions allowed by the system. For instance, the example above specifies a condition which is matched any ClientID appearing in a field of the request labeled "iot:ClientID" of the form 'id*', where * indicates a wildcard. The policy statement next specifies that the policy statement applies only to a particular resource, although that resource may be specified as a function of the ClientID in the request (i.e., policy statements may contain variables). Next, the policy statement specifies that the statement pertains to a particular action denoted by "iot:Connect." Finally, the policy statement specifies how request should be handled, namely that the iot:Connect action should be allowed for requests that match the specified ClientID and a unique resource corresponding to the particular ClientID.

Next, a step 404 the system transforms the received policy into an access constraint that can be understood and processed using a constraint solver such as the solver 125. For example the system may use and SMT constraint solver which expects inputs in a format such that SMT2 format. As an example, the system may transform the policy into an access constraint such as the example constraint below which corresponds to the example policy above:
  resource="arn:iot:client/".iot:ClientId &&
  iot:ClientIdExists &&
  match(iot:ClientId, "id*")

Because the policy statement above requires a matching ClientID accompanied by a request to a corresponding resource, solutions to this constraint will consist of paired values in the form {ClientID, Resource}. Thus, two example solutions to the example constraint are:
  resource="arn:iot:client/id1", iot:ClientId="id1"
  resource="arn:iot:client/id2", iot:ClientId="id2"

Since an access constraint may have infinitely many solutions (e.g., no restrictions on ClientID), the system may be configured to count the number of solutions of having ClientIDs (and/or other parameters)<=k, for some bound k (e.g., if k is 5, then the number of solutions with length <=5 is counted). In some embodiments, the system may analyze the policy (which, in the example above, requires that valid ClientIDs must start with "id") and count how many ClientIDs are allowed by the policy. In the preceding example, there are approximately $1.7 \times 10^7$ solutions with ClientIDs having lengths less than or equal to five, approximate $1.9 \times 10^{10}$ solutions with ClientIDs having lengths less than or equal to ten, and so on.

At step 406 the system determines the total number of possible valid client identifiers (i.e., ClientIDs). In some embodiments, the system may use an automata-based solver such as the open-source Automata-Based Model Counter ("ABC"). Such solvers may construct a representation of an access constraint (and/or other constraints) as a finite state machine which receives a potential solution to the constraint as an input. The finite state machine may be presented by a state diagram which progresses from an initial state through a series of intermediate states to a final state for each possible input. Inputs corresponding to paths through the state diagram which progress from the initial state to a final state indicating that the constraint is satisfied are solutions to the constraint. Thus, the number of unique solutions to a constraint may be determined by counting a number of unique paths through a state diagram which proceed from the initial state to the final state indicating that the constraint is satisfied.

These counts may be orders of magnitude larger than over the total number of devices which access the system, let alone those owned by a single user of the system such as the user 102 (authentication credentials typically being issued to client devices associated with a particular user of the system rather than multiple users). Recall that the potential impact of a compromised authentication credential may be as large as the total unique ClientIDs allowed by the policy, which may be far smaller than the total number of devices affected if a the authentication credential is compromised. This requires quantifying permissiveness of a policy with respect to actual devices. The counts reported by solving an access constraint as described are how many potential ClientIDs this policy could allow, not how many it actually does. However, if we modify the access constraint to include both the original policy and add the a further statement limiting the policy to ClientIDs used by devices associated with the user (or with a particular authentication credential when the user employs more than one), the number of solutions to this modified constraint then corresponds to the number of devices which may be affected if the authentication credential they use is compromised (because each device using a compromised credential may need to be deactivated or otherwise reconfigured). Further details of the process of constraining the set of possible valid ClientIDs to those used the by the user (or using a particular authentication credential) will be described in greater detail below in connection to FIGS. 5A and 5B.

At step 408, the system may determine a number of access requests including valid ClientIDs that form unique solutions to the access constraint, as described above and in further detail below. A step 410, the system may output one or more metrics (e.g., the metrics 132) indicating permissiveness of initial access policy based on comparison of number of unique solutions to access constraint with total number of possible valid access requests. For instance, using the examples above, one such metric may be number of ClientIDs included in access requests allowed by the policy express as a fraction of the total number of valid (or relevant) ClientIDs.

At step 412, the system may generate a modified access policy by downscoping the initial access policy using data indicating previously-received access requests allowed according to the access policy. In some embodiments, such data may also be used to constrain the total number of valid ClientIDs to those associated with the user (or a particular authentication credential) as described above and in further detail below in connection to FIGS. 5A,B.

ClientIDs may be long strings and as discussed previously, it can be inefficient to store lists of all ClientIDs. In some embodiments, the data indicating the previously-allowed requests are used to "learn" a general form of allowed ClientIDs and generate a regular expression which can be used to represent all valid ClientIDs. Generally, such a regular expression may accept many more strings than the relevant ClientIDs in use. Let $A_R$ be an automata corresponding to all ClientIDs matching the regular expression, and let $A_P$ be an automata for a policy P. We may define the intersection of the ClientIDs satisfying $A_R$ with the ClientIDs of requests satisfying $A_P$ as $A_{RP}$. The number of ClientIDs in $A_{RP}$ ($N_{RP}$) will include more ClientIDs than those seen in the previously allowed requests (e.g., allowed requests 112). We can use the fact that the number of ClientIDs in $A_R$ ($N_R$) will be greater than or equal to $N_{RP}$ when characterizing the permissiveness of policy P. For instance if $N_R \gg N_{RP}$ then the policy isn't very permissive. In other words, the closer $N_{RP}$ is to $N_R$, the more permissive the policy. This is still an approximation, but one those will typically be more precise than reasoning about the number of ClientIDs in $A_P$ alone. Thus, in some embodiments generating the downscoped policy includes determining a regular expression that matches ClientIDs in the previously received access requests allowed according to the access policy (e.g., the policy 115) and modifying the access constraint corresponding to that policy to allow only ClientIDs that are also matched by the regular expression.

At step 414, the system may determine a value of a metric indicating permissiveness of the downs coped access policy similarly to the determination of permissiveness of the initial access policy at Step 410. At step 416, the system mat compares the two metrics to determine whether than modified policy is less permissive than the initial policy. In some embodiments, the system may determine that the modified policy is less permissive than the initial policy only if metric indicating permissiveness of the modified policy is less than the corresponding metric for the initial power by at least a predetermined threshold. Finally, if the system determines that the modified policy is less permissiveness than the initial policy, the system may proceed to Step 418 and provide a recommendation or other notification to the user via the user interface to implement the modified access policy in place of the initial access policy.

Figure 5A:
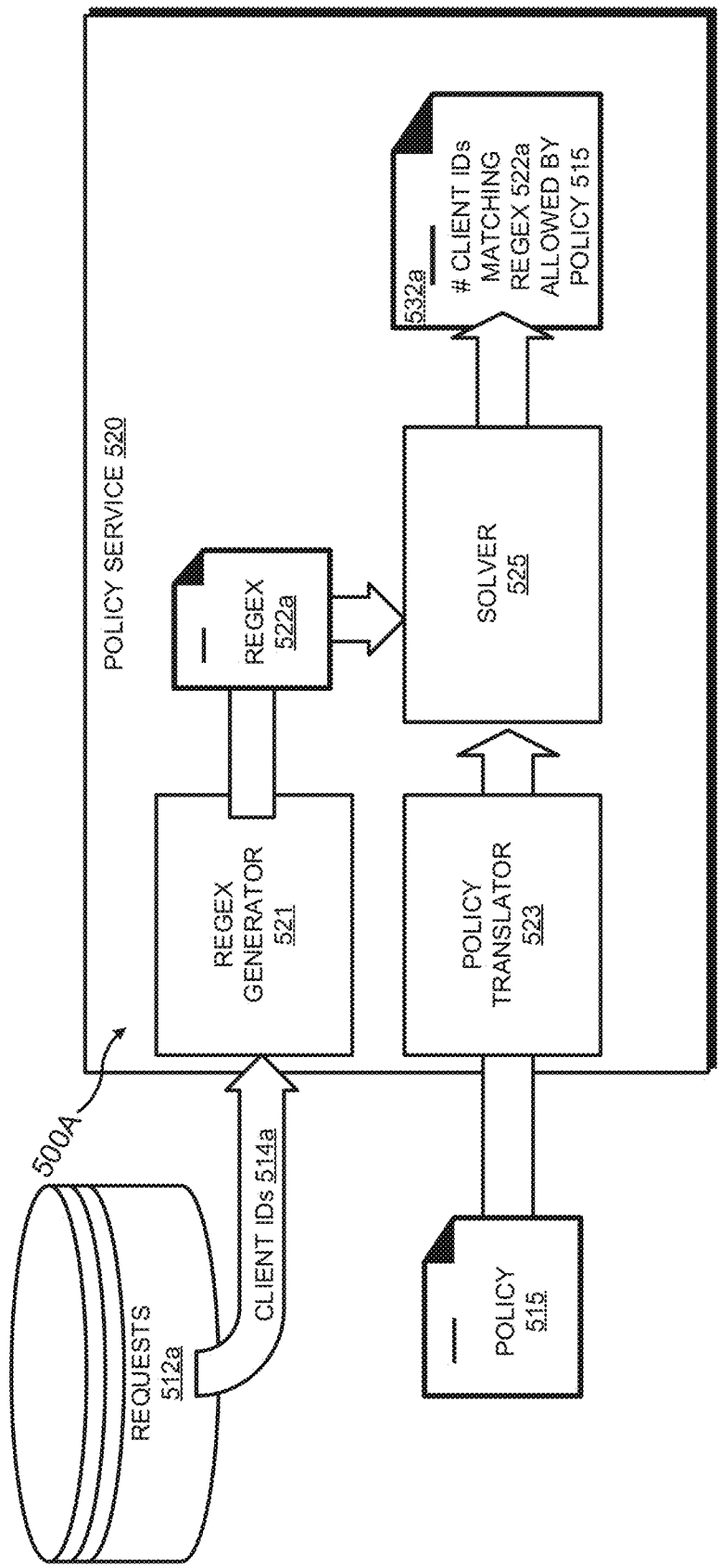
FIGS. 5A and 5B are block-level flow diagrams illustrating additional example procedures performed in embodiments disclosed herein.

FIG. 5A illustrates a policy service 520 (e.g., the policy service 120) performing an example procedure to generate a metric 532*a* indicating permissiveness off an access policy 515 (e.g., steps 402-410 in procedure 400) according to certain embodiments. The policy service 520 may receive ClientIDs 514*a* associated with requests 512*a* from authenticated users previously allowed according to the access policy 515. The policy service 520 uses the regex generator 521 to generate a regular expression (regex 522*a*) which matches each of the ClientIDs 514*a*. The policy service also receives the policy 515 and transforms the policy 515 into an access constraint compatible with the solver 525. The policy service 520 may also use the regex 522*a* as a further constraint input to the solver 525. Using the solver 525, the policy service 520, may output a number of ClientIDs satisfying (i.e., matched by) the regex 522*a* and which satisfy the access policy 515.

Figure 5B:
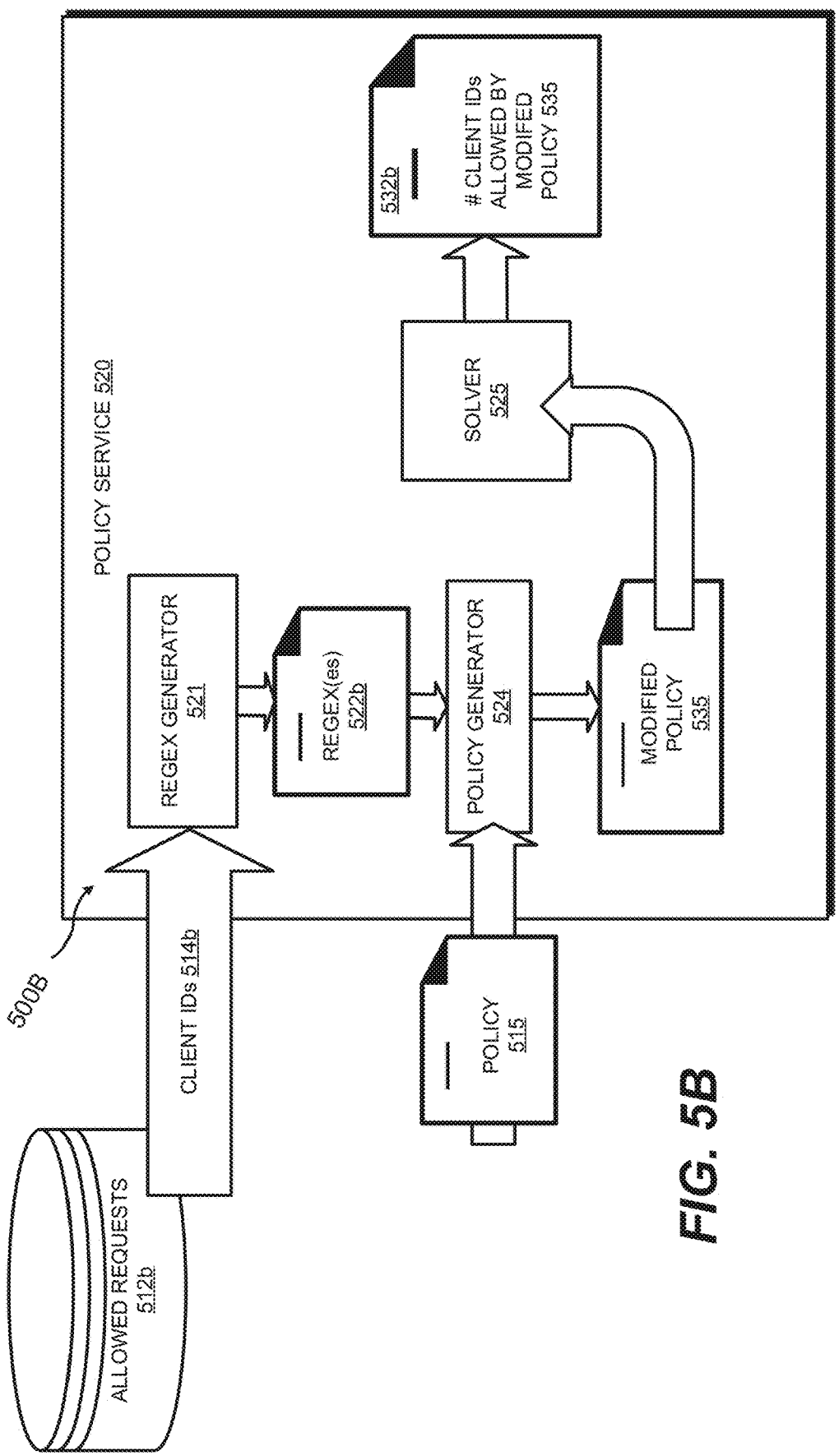

FIG. 5B illustrates the policy service 520 (e.g., the policy service 120) performing an example procedure 500B (e.g., steps 412-414 of the example procedure 400) to generate a modified access policy and a metric 532*b* indicating permissiveness off an access policy 515 (e.g., steps 402-410 in procedure 400) according to certain embodiments. The policy service 520 may generate a regex 522*b* (or multiple regexes 522*b*) and the initial access policy 515 as inputs to the policy generator 524. The regex(ex) 522*b* may be generated using only allowed requests 512*b* (which may be a subset of the requests 512*a*) and ClientIDs 514*b* associated with those requests 512*b*. The policy generator 524 may add a constraint to the access constraint generated from the access policy 515 by the policy translator as described in connection to the procedure 500A above described in connection to FIG. 5B. The policy generator 524 may then add an additional constrain to the initial access constraint corresponding to the regex(es) 522*b*. The modified policy 535 may be provided in the form of an access constraint to the solver 525 which outputs a number of distinct access requests allowed by the modified access policy 535 as the metric 532*b* indicating permissiveness of the modified access policy 535.

The regex generator 521 may use various techniques to "learn" the regex 522. One example method includes "naively" learning the regex 522 by learning prefixes and suffixes obtained from grouping similar ClientIDs. As a simple non-limiting example, a set of ClientIDs with a common prefix {foo1, fooabcd, fooooo} may be matched by a regular expression 'foo*'. Similarly, a set of ClientIDs with a common suffix {123bar, abcbar} may be matched by a regular expression '*bar' 112. Another example method includes a prefix tree (or "tie") method which comprises building a prefix tree from a list of previously seen ClientIDs, minimizing the prefix tree using a minimization algorithm such as Hoperoft's algorithm, and generating a regular expression from the minimized prefix tree using a method such as Brozozowksi's algebraic method. In some embodiments, regular expressions generated according to the methods above and similar methods may be incompatible with an expected policy format of the system. In such embodiments, the regex generator may output a simplified regular expression (or a set of rules including multiple regular expressions) which is compatible with the policy format matches the same set of ClientIDs.

Figure 6A:
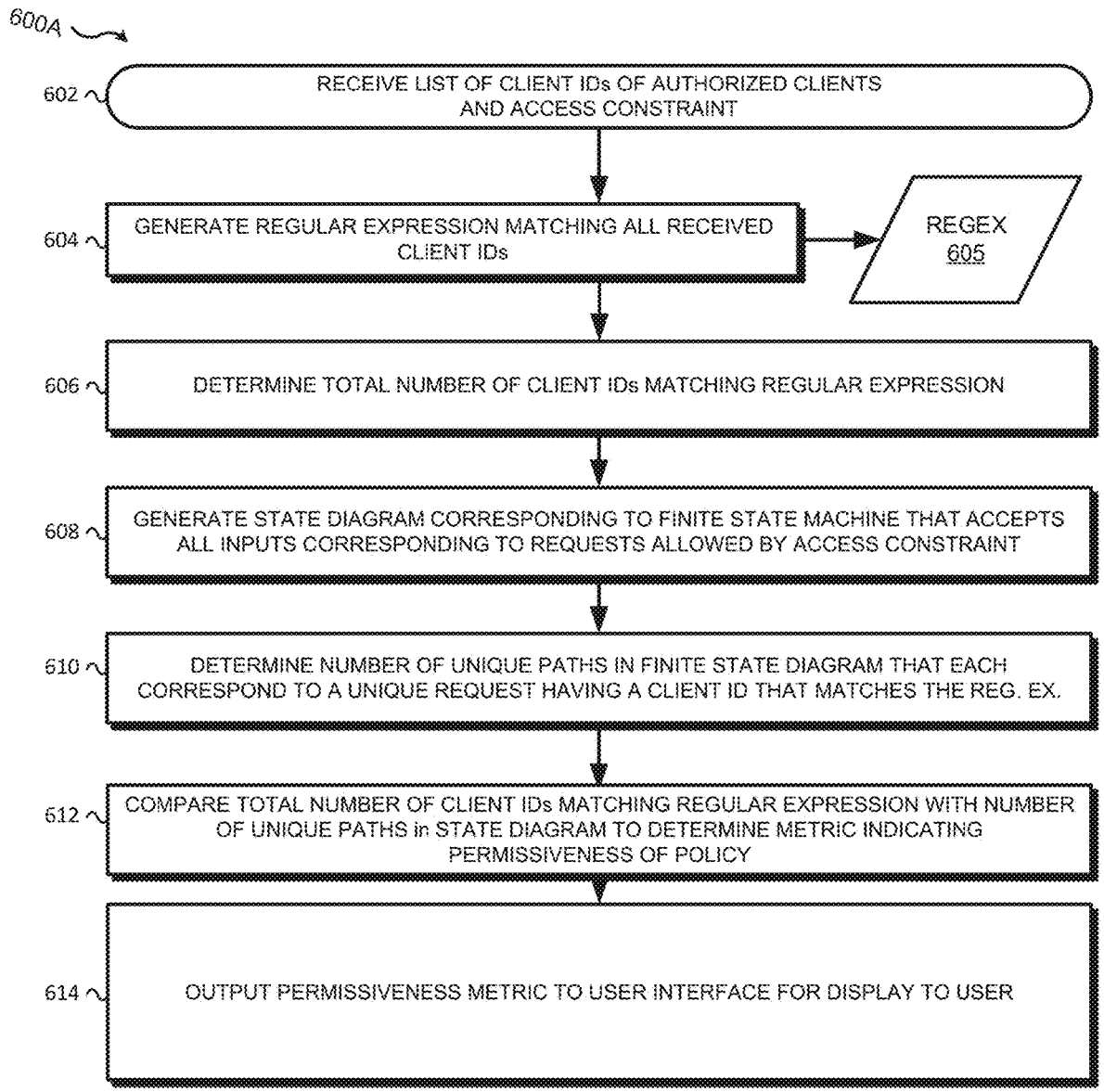
FIGS. 6A and 6B are flow diagrams illustrating the example procedures of FIGS. 5A and 5B as performed according to certain embodiments.

FIG. 6A illustrates a simplified example procedure 600A performed by a system (e.g., a policy service 120, 520) in certain embodiments that includes steps 602, 604, 606, 608, 610, 612, and 614. In this simplified example, an access policy allows or disallows one possible action for a number of ClientIDs. At step 602, the system receives data associated with access requests received from authorized clients (e.g., client devices 104 authenticated using an X.509 certificate or other credential associated with a user such as the user 102). These ClientIDs may therefore be indicative of the range of possible valid ClientIDs for a user such as the user 102 or for a particular authenticated credential issued by or associated with the user for use by various client devices. At step 602 the system also receives (or generates) and access constraint corresponding to an access policy to evaluate such as an access policy 115, 515. At step 604, the system generates a regular expression 605 matching all the received ClientIDs.

At step 606, as one allowed method of determining or estimating the total number of valid ClientIDs for the access policy, the system may determine the number of possible strings that are matched by the regex 605 (e.g., the regex 522a). In some embodiments, the maximum length of the regex 605 may be constrained to a predetermined maximum length and/or to a length of a longest ClientID belonging to the received list of ClientIDs.

At step 608, the system generates a state diagram corresponding to a finite state machine that accepts inputs corresponding to requests. The state diagram may have an initial state, one or more intermediate states, and a final state corresponding to an accepted access request. In order to determine the number of requests allowed by the access policy, the system may count or otherwise determine the number of unique paths in the state diagram which proceed from the initial state to the final state indicating that the input corresponds to a request allowed by the access policy. At step 610, the system determines all unique paths corresponding to an allowed request as described, which is equivalent to determining all unique ClientIDs which match the regular expression 605 and also correspond to a unique path in the state diagram that proceeds to the final state which indicates an accepted request. At step 612, the system compares the number of allowed ClientIDs determined as described above to the total number of possible valid ClientIDs and uses this comparison to output a metric indicating the permissiveness of the access policy. An example metric indicating permissiveness in some embodiments is the ratio of the number of allowed ClientIDs to the total number of valid client IDs, as indicated by the total number of ClientIDs having lengths greater or equal to a maximum length device that are matched by the regex 605. This metric indicated permissiveness is displayed to the user via the user interface at Step 614.

It should be understood that, in simplified examples such as the example procedure 600A, permissiveness may be expressed as a simple ratio of the number of actions allowed by a policy to the number of all possible actions that are valid. In some embodiments, the number of valid actions may be estimated using constraints such as limiting valid ClientIDs to a maximum length or defining valid ClientIDs according to a particular format. Such constraints may be situationally defined; for example, if multiple users of a platform provided by a computing resource service provider (e.g., a computing resource service provider 199, 399) are each allocated non-overlapping ranges of ClientIDs, then the permissiveness of a policy deployed by or on behalf of a particular user (e.g., the user 102) may be evaluated only with respect to ClientIDs allocated to that user. In other use cases, it may be more complicated to define permissiveness and the system may employ additional metrics based on heuristics to indicate permissiveness. For example, the system may assign a permissiveness score to each policy and then output a percentile indicating the a statistical comparison between the permissiveness score of the policy being evaluated and other policies. This may be useful when policies include complex limitation based on factors other than just ClientID, such as the time of the request, an actual or inferred location of the device transmitting the request, particular resources required to respond the request, and so on. In such instances, the number of allowed requests may be dependent on numerous factors, and metrics incorporating some or all of such factors to indicate permissiveness of the access policy may be implemented.

Figure 6B:
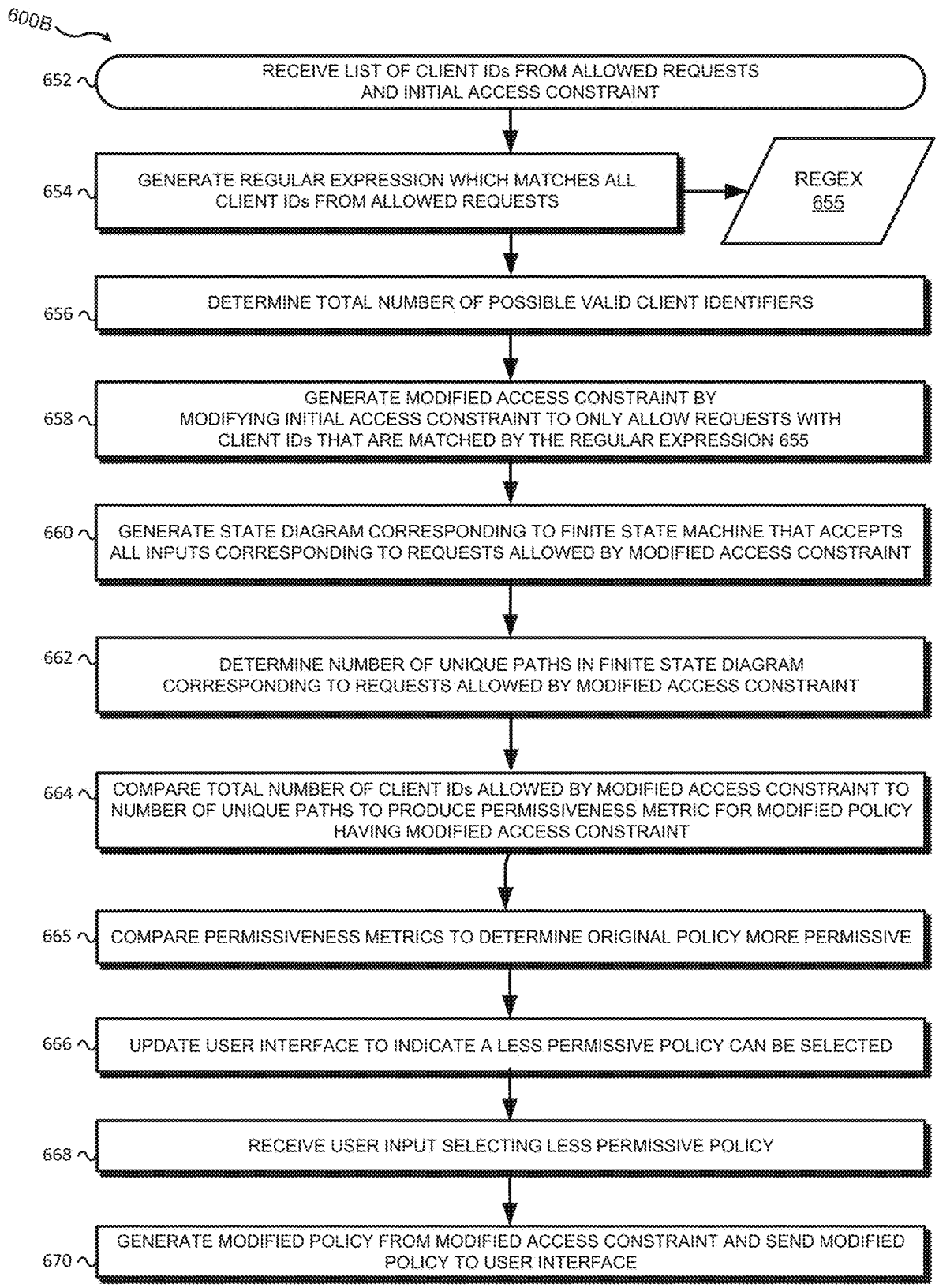

FIG. 6B illustrates an example procedure 600B performed by a system (e.g., a policy service 120, 520) to generate a modified access policy (i.e., an automatically downscoped policy) and determine the permissiveness of that modified policy in certain embodiments. At step 652 the system receives a list of authenticated ClientIDs associated with allowed access requests (e.g., the allowed requests 512b and/or a subset of the requests 512a) and receives (or generates) an initial access constraint derived from an initial access policy such as an access policy 115, 515. At step 654 the system generates a regular expression 655 that matches all the received ClientIDs (i.e., ClientIDs associated with access requests that were allowed by the system). At step 656 the system determines the total number of possible valid ClientIDs using any suitable method, such as the regex-based method described as part of the example procedure 600A. At step 658 the system generates a modified access constraint by further constraining the initial access constraint to accept only ClientIDs that are matched by the regex 655. If the initial access constraint corresponding to the initial access policy grants access to various resources to a wider range of ClientIDs than actually require access, then the number of client IDs matching the regex 655 may well be much smaller than the total number of valid ClientIDs and the modified access constraint will allow fewer ClientIDs than the initial access constraint while still allowing the ClientIDs that actually access the resources controlled by the initial access policy. In various embodiments, the set of all "valid" ClientIDs may be determined in various ways depending on the use case. For instance, an access policy may contain a condition that requires an access request to originate from a client that has previously been authenticated. In particular, the access policy may require that the client has presented a recognized X.509 certificate. In such instances, a list of all ClientIDs (or a format for all ClientIDs) which have access to the certificate may be known and the set of all valid ClientIDs can be constrained to the listed ClientIDs or to a regular expression that matches the format. When the list of valid IDs or the general format is unknown or not known completely, the system may learn a regular expression to estimate how many valid ClientIDs exist using methods described above in connection to the example procedure 600A.

For example, a user may deploy 10,000 IoT client devices and use a default access policy which allows all 10,000 devices to connect to controlled resources or perform other actions. However, in practice, only a small fraction of these client devices (100, for example) may actually be configured to perform certain actions (or even any actions) controlled by the access policy. Thus, in this example, the policy only needs to allow the 100 client devices that actually perform actions controlled by the system. However, if all 10,000 devices share a single authentication credential (e.g., an X.509 certificate) and this credential is compromised, a hackers may perform actions on behalf of 10,000 different client devices. In some instances, security concerns might mandate immediate deactivation, re-provisioning, or other servicing of all 10,000 client devices, In such instances, the regex 655 may match only the ClientIDs of the 100 "active" client devices. Even if the regex 655 matches more than just the "active" devices, it is likely to match many fewer than all 10,000 ClientIDs. In this case, the risk of a compromised authentication credential (such as a common X.509 certificate issued to many different client devices (e.g., client devices 104) may be greatly reduced by applying a modified access policy generated by the system from the modified access constraint in place of the initial access policy. The advantages will be even greater in extreme cases such as those in which the access policy allows any ClientID whatsoever.

Put simply, the initial access policy may be a default policy that it not tailored to a user's actual use cases or it may be difficult for an user to write a policies tailored to their use cases when the number of potential ClientIDs is large and/or when a use case is constantly evolving. In environments controlled by both authentication procedures and access policies, access policies can provide a second line of defense against malicious behavior when they significantly constrain the actions authorized (or authenticated) clients may perform. Therefore, one object of systems and methods disclosed herein is to first determine how many possible actions a policy might allow and then determine how many of those actions are actually allowed.

In general, the fewer actions allowed, the less permissive a policy and the greater the level of additional security it may provide. However, a useful policy must generally not prevent clients which should be allowed to perform an action from performing that action (or at least not routinely). Thus an additional object is to determine, based on log data or other suitable information, how many of the actions allowed by a policy are actually performed by the system in response to access requests processed by the system according to the policy. For instance, a policy might allow 100 actions out of 1000 possible actions. However, it may be the case that, in operation, the system is only observed receiving (and allowing) requests to perform 50 of those 100 allowed actions. In this scenario, the policy may not be extremely permissive (it allows only 10% of all possible actions) but it is more permissive than it needs to be because it allows actions that no client requests to perform. Steps 654 and 658 allow the system to automatically generate a further constraint which further limits the initial access constraint in an automated manner which is likely to approach the ideal result of only allowing requests the access policy needs to allow in order to respond to actions that are actually requested by clients during normal operation of the system.

At step 660, in order to ultimately determine the permissiveness of the modified access constraint (and thus ultimately determine whether it is less permissive than the initial access constraint), the system generates a state diagram represented a state machine that processes access requests according to the modified access constraint, analogously to step 608 of example procedure 600A. At step 662, analogously to step 610 of example procedure 600A, the system determines a number of unique paths in the state diagram corresponding to the number of distinct access requests allowed by the modified access constraint. At step 664 (analogously to step 612 of procedure 600A) the system compares the total number of requests allowed (i.e., ClientIDs allowed to initiate connections in this simplified example) to the total number of valid ClientIDs and proceeds to output a metric indicating permissiveness of the modified access constraint based on this comparison.

At step 665 this permissiveness metric may then be used to determine whether the modified access constraint is less permissive (or sufficiently less permissive based on a predetermined threshold) than the initial access constraint. For example, if the initial access constraint allows 100 out of 1000 possible actions and the modified access constraint allows 99, it may be undesirable to suggest the user review and implement the modified access policy when it allows a similar number of requests as the initial access policy. If, however, the modified access constraint allows significantly fewer requests, then it may be desirable to recommend a policy implementing the modified access constraint to the user.

Although the foregoing descriptions have described the permissiveness of access policies in terms of numbers or proportions of ClientIDs allowed by those polices, it should be understood that these descriptions are simplified examples for ease of understanding. For instance, an access policy may allow more than one action to be performed. In such cases, the permissiveness of a policy may depend not only on the total number of allowed ClientIDs but also the number of actions allowed for each ClientID relative to the total number of actions allowed over all allowed ClientIDs.

As one non-limiting example, an initial access policy may allow all ClientIDs matching the expression 'foo\*' to read from a datastore such as an Amazon S3 Bucket and write data to that bucket. However, only 10 out of 100 clients (based on their ClientIDs) whose ClientIDs end in 'bar' may actually write data to that bucket. In this instance, if a hacker gains access to the system the hacker can write data by impersonating any of 100 different clients and it may be necessary to disable access for all 100 clients whose ClientIDs match the expression 'foo\*'. But if the policy is modified (i.e., "downscoped") to allow write access for only the 10 clients that "need" to write data based on the behavior of the system and clients in ordinary circumstances (i.e., ClientIDs that match the expression 'foo\*bar'), then fewer ClientIDs are compromised with respect to write requests if a hacker is able to issue spoofed access requests.

At step 665 the system may update a user interface display or otherwise notify a user that a less permissive (or sufficiently less permissive) policy may be implemented (i.e., a policy implementing the modified access constraint as described above). At step 668, the system may receive user input selecting the less permissive policy. At step 670, the system may generate a modified access policy that implements the modified access constraint (using a policy generator such as the policy generator 524 to transform the modified access constraint into a modified access policy according to a policy format definition of the system, for example). The system may display the modified access policy via the user interface by review by the user and the user may instruct the system to implement the modified access policy in place of the initial access policy.

In some embodiments, as a non-limiting example, an access policy may allow multiple actions, such as initiating a connection, reading data, writing data, etc. For each allowed action the regex generator 521 may generate multiple regular expressions (e.g., regexes 522b), each regex matching only allowed ClientIDs 514b allowed to perform that action in the allowed requests 512b and generate the modified policy according to the methods described above, such that the modified (i.e., a downscoped policy) only allows ClientIDs matched by a regex corresponding to each action to perform that action. As a further non-limiting example, the system may generate regexes 522b based on particular resources to which access is controlled using the initial policy 515. For example, if the initial access policy 515 allows all ClientIDs access to a particular resource, but only certain ClientIDs (or classes thereof) are observed accessing that resource, the modified policy 535 may exclude ClientIDs which do not access that resource from being granted access.

Figure 7:
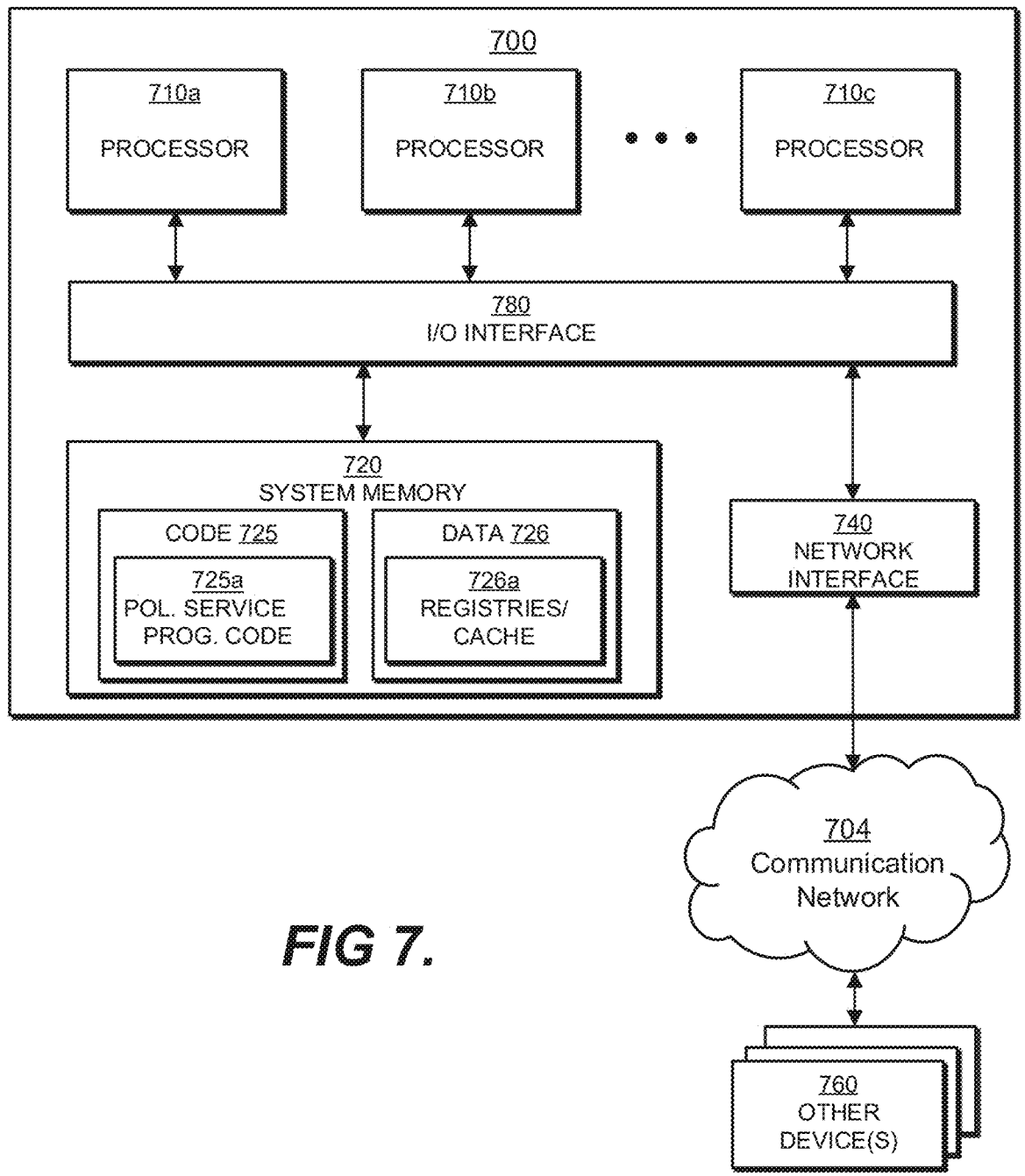
FIG. 7 is a diagram of a computing environment including an example computing device specially configured to implement the presently described systems and methods.

In at least some embodiments, a computing device that implements a portion or all of one or more of the technologies described herein, including, but not limited to, the techniques to implement the functionality of the policy service 120, can include one or more computer systems that include or are configured to access one or more computer-accessible media. FIG. 7 illustrates such a computing device 700. In the illustrated embodiment, computing device 700 includes one or more processors 710a, 710b, . . . , 710n (which may be referred herein singularly as "a processor 710" or in the plural as "the processors 710") coupled to a system memory 720 via an input/output (I/O) interface 780. Computing device 700 further includes a network interface 640 coupled to I/O interface 780.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, Power PC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods techniques, and data described above, are shown stored within system memory 720 as code 725 and data 726. The code 725 may particularly include policy service program code 725a and/or other types of machine-readable instructions executable by one, some, or all of the processors 710a-n to implement the policy service 120; similarly, the data 726 may particularly include data 726a such as registries, cache layers, configuration information, and so on.

In one embodiment, I/O interface 780 may be configured to coordinate I/O traffic between processor(s) 710a-n, system memory 720, and any peripheral devices in the device, including network interface 640 or other peripheral interfaces. In some embodiments, I/O interface 780 may perform any necessary protocol, timing, or other data transformations to convert data signals from one component (e.g., system memory 720) into a format suitable for use by another component (e.g., processor(s) 710a-n). In some embodiments, I/O interface 780 may include support for devices attached through various types of peripheral buses, such as a variant of the Peripheral Component Interconnect (PCI) bus standard or the Universal Serial Bus (USB) standard, for example. In some embodiments, the function of I/O interface 780 may be split into two or more separate components, such as a north bridge and a south bridge, for example. Also, in some embodiments some or all of the functionality of I/O interface 780, such as an interface to system memory 720, may be incorporated directly into processor 710.

Network interface 740 may be configured to allow data to be exchanged between computing device 700 and other device or devices 760 attached to a network or network(s) 750, such as user computing devices and other computer systems described above, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fiber Channel SANs or via any other suitable type of network and/or protocol.

In some embodiments, system memory 720 may be one embodiment of a computer-accessible medium configured to store program instructions and data for implementing embodiments of the present methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 780. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 640. Portions or all of multiple computing devices, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more services (such as various types of cloud-based computing or storage)

accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, as further described by example below.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements change over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, up-front cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager. Such an interface may include capabilities to allow browsing of a resource catalog and details and specifications of the different types or sizes of resources supported and the different reservation types or modes supported, pricing models, and so on.

In accordance with the above description, the present disclosure provides, in an example embodiment, a system comprising one or more processors and memory storing computer-executable instructions. The instructions, when executed by the one or more processors, cause the system to receive an initial access policy from a user of the system. The initial access policy specifies actions that the system is allowed to perform on behalf of clients in response to access requests. Executing the instructions further cause the system to transform the access policy into an access constraint having solutions corresponding to access requests allowed by the initial access policy. The initial access constraint consists of one or more predicate logic statements that describe respective results of applying the initial access policy to all possible access requests. Executing the instructions further cause the system to construct, in the memory, a first finite state diagram corresponding to the access constraint. The first finite state diagram represents a finite state machine that, when provided with an access request allowed by the initial access policy as an input, proceeds from a first initial state to a first particular state. Executing the instructions further cause the system to determine a first number of unique paths in the first finite state diagram that proceed from the initial state to the particular state; determine a total number of possible client identifiers; and output, via a user interface provided by the system, a notification indicating a degree of permissiveness of the initial access policy based a comparison of the first number of unique paths in the first finite state diagram and the total number of possible client identifiers.

In certain embodiments, the memory stores further instructions that, when executed by the one or more processors, cause the system to receive and process access requests from clients; generate a list of client identifiers contained in the access requests; determine a regular expression that matches all client identifiers belonging to a list of client identifiers associated with a set of the access requests allowed by the system according to the initial access policy; and construct, in the memory, a second finite state diagram corresponding to a modified access constraint that excludes client identifiers that are not matched by the regular expression from the access constraint. The second finite state diagram represents a finite state machine that, when provided with an access request allowed by the modified access constraint as an input, proceeds from a second initial state to a second particular state. Executing these further instructions also causes the system to determine a second number of unique paths in the second finite state diagram that proceed from the second initial state to the second particular state; and in response to determining that the second number of unique paths is less than the first number of unique paths by at least a predetermined threshold, provide a notification to the user via the user interface. The notification indicates that modified access constraint is less permissive than the initial access policy received from the user.

In one such embodiment the memory stores further instructions that, when executed by the one or more processors, cause the system to generate a modified access policy corresponding to the modified access constraint according to a policy format definition that defines a format of the initial access policy. In one such embodiment, generating the modified access policy according to the policy format definition comprises: determining that a regular expression operator in the regular expression is an invalid operator according to the policy format definition; determining one or more valid operators according to the policy format definition that are equivalent to the invalid operator; and including a string matching condition in the modified access policy that matches strings matched by the regular expression, the string matching condition including the one or more valid operators in place of the invalid operator. In one such embodiment determining the total number of possible client identifiers comprises determining a number of possible strings matched by a regular expression that matches all client identifiers belonging to the list of authorized client identifiers.

In another example embodiment, a system comprising one or more processors and memory storing computer-executable instructions that, when executed by the one or more processors, cause the system to receive an initial access policy from a user of the system. The initial access policy specifies respective actions that the system may perform on behalf of clients in response to access requests including a client identifier. Executing the instructions also causes the system to transform the initial access policy into an initial access constraint having solutions corresponding to requests allowed by the initial access policy. The initial access constraint consists of one or more predicate logic statements that describe respective results of applying the initial access policy to all possible access requests. Executing the instructions also causes the system to determine, as a number of requests allowed by the initial access policy, a number of all distinct solutions to the initial access constraint; determine a total number of possible client identifiers; and output, via a user interface provided by the system, a notification indicating a degree of permissiveness of the initial access policy based on a comparison of the number of requests allowed by the initial access policy and the total number of possible client identifiers.

In some embodiments, determining the total number of possible client identifiers comprises accessing log data indicating previous access requests of authorized clients previously processed by the system according to the initial access policy; and generating a regular expression that matches each of the client identifiers associated with the previous access requests. The log data includes client identifiers associated with the previous access requests. In one such embodiment generating the regular expression that matches each of the client identifiers associated with the previous access requests further comprises restricting the general expression to matching only client identifiers having a length less than or a equal to a length of a longest client identifier included in the previous access requests.

In one embodiment the memory stores further instructions that, when executed by the one or more processors, cause the system to generate a second regular expression that matches all client identifiers associated with previous allowed requests of the previous access requests allowed by the system according to the initial access policy; generate a modified access constraint that further limits solutions to the initial constraint to access requests that include client identifiers matched by the second regular expression; determine that a number of all distinct solutions to the modified access constraint is constraint is less than the number of distinct solutions to the initial access constraint by at least a predetermined threshold; and generate a modified access policy that allows requests that form solutions to the modified access constraint in a format specified by a policy format definition that defines a human-readable format of the initial access policy.

In one embodiment, the memory stores further instructions that, when executed by the one or more processors, cause the system to output, via the user interface, a notification to the user that the modified access policy is less permissive than the initial access policy; provide the modified access policy to the user in the human-readable format of the initial access policy; replace the initial access policy with the modified access policy; and process new access requests according to the modified access policy.

In one embodiment, determining the number of all distinct solutions to the initial access constraint comprises constructing, in the memory, a first finite state diagram corresponding to the access constraint, the first finite state diagram representing a finite state machine that, when provided with an access request allowed by the initial access policy as an input, proceeds from a first initial state to a first particular state; and determining a first number of unique paths in the first finite state diagram that proceed from the initial state to the particular state. In this embodiment, determining the number of all distinct solutions to the modified access constraint comprises: constructing, in the memory, a second finite state diagram corresponding to the modified access constraint, the second finite state diagram representing a finite state machine that, when provided with an access request allowed by the modified access policy as an input, proceeds from a second initial state to a second particular state; and determining a second number of unique paths in the second finite state diagram that proceed from the initial state to the particular state.

In one embodiment, the instructions, when executed by the processor to generate the modified access policy in the format specified by the policy format definition, cause the system to determine that an operation included in the second regular expression is an invalid operation according to the policy format definition; determine one or more valid operations that implement the invalid operation in accordance with the policy definition format; and include the one or more valid operations in the modified access policy in place of the invalid operation.

In one embodiment, transforming the initial access policy into the initial access constraint comprises accessing log data indicating previous access requests of authorized clients received by the system, the log data including client identifiers associated with the allowed access requests; determining a maximum length of the client identifiers associated with the previous access requests; and including a requirement in the initial access constraint that allows only client identifiers having a length that does not exceed the maximum length.

In one embodiment determining the number of all distinct solutions to the initial access constraint comprises constructing, in the memory, a first finite state diagram corresponding to the access constraint, the first finite state diagram representing a finite state machine that, when provided with an access request allowed by the initial access policy as an input, proceeds from a first initial state to a first particular state; and determining a first number of unique paths in the first finite state diagram that proceed from the initial state to the particular state.

In another example embodiment a method comprises receiving an initial access policy, the initial access policy specifying, respective actions that a computing system is allowed to perform in response to an access requests received from clients; transforming the initial access policy into an initial access constraint having solutions consisting of one or more predicate logic statements that are satisfied by access requests allowed by the initial access policy; determining a first number of all possible access requests that satisfy the initial access constraint; receiving data indicating characteristics of previous access requests; determining a first number of all valid requests based on the characteristics of the previous access requests; and outputting, via a user interface provided by the system, a notification indicating a degree of permissiveness of the initial access policy based a comparison of the first number of all possible access requests and the first number of all valid requests.

In one embodiment, determining the first number of all possible requests comprises applying a machine learning algorithm to generate a first regular expression which matches client identifiers associated with the previous access requests; and determining the first number of all valid access requests comprises determining all access requests having client identifiers matched by the first regular expression that also satisfy the initial access constraint.

In one embodiment the method further comprises generating a modified access policy by: generating a modified access constraint that is only satisfied by access requests that satisfy the initial access constraint and also include client identifiers that are matched by the first regular expression; determining that a second number of all valid access requests that satisfy the modified access constraint is fewer than the first number of all possible access requests by at least predetermined threshold; generating the modified access policy according to policy formatting instructions and the modified access constraint; and processing access requests according to the modified access policy in place of the initial access policy.

In one embodiment, determining the first number of valid requests comprises, for each action of a plurality of actions allowed by the initial access policy, determining a number of client identifiers matched by the first regular expression that are allowed to perform that action according to the initial access policy.

In one embodiment, the method further comprises generating a modified access policy by: for each action of the plurality of actions allowed by the initial access policy, using a machine learning algorithm to generate a corresponding additional regular expression that matches client identifiers previously allowed by the system to perform that action according to the initial access policy; generating a modified access constraint by that is only satisfied by an access request to perform a requested action of the plurality of actions that: (1) satisfies the initial access constraint; and (2) includes a client identifier matched by the additional regular expression corresponding to the requested action; determining that a second number of all valid access requests that satisfy the modified access constraint is fewer than the first number of all valid access requests by at least predetermined threshold; generating the modified access policy according to policy formatting instructions and the modified access constraint; and processing access requests according to the modified access policy in place of the initial access policy.

In one embodiment, the method further comprises the method further comprising: generating a modified access policy by: for each computing resource of a plurality of computing resources specified by the initial access policy, using a machine learning algorithm to generate a corresponding additional regular expression that matches client identifiers previously allowed by the system to perform actions directed to that computing resource according to the initial access policy; generating a modified access constraint by that is only satisfied by an access request directed to a requested computing resource of the plurality of computing resources that: (1) satisfies the initial access constraint; and (2) includes a client identifier matched by the additional regular expression corresponding to the requested computing resource; determining that a second number of all valid access requests that satisfy the modified access constraint is fewer than the first number of all valid access requests by at least predetermined threshold; generating the modified access policy according to policy formatting instructions and the modified access constraint; and processing access requests according to the modified access policy in place of the initial access policy.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network ("NFS"), Common Internet ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, PostgreSQL, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of datastores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising one or more processors and memory storing computer-executable instructions that, when executed by the one or more processors, cause the system to:
   receive an initial access policy from a user of the system, the initial access policy specifying actions that the system is allowed to perform on behalf of clients in response to access requests;
   transform the initial access policy into an initial access constraint having solutions corresponding to access requests allowed by the initial access policy, the initial access constraint consisting of one or more predicate logic statements that describe respective results of applying the initial access policy to all possible access requests;
   construct, in the memory, a first finite state diagram corresponding to the initial access constraint, the first finite state diagram representing a finite state machine that, when provided with an access request allowed by the initial access policy as an input, proceeds from a first initial state to a first particular state;
   determine a first number of unique paths in the first finite state diagram that proceed from the initial state to the particular state;
   determine a total number of possible client identifiers; and
   output, via a user interface provided by the system, a notification indicating a degree of permissiveness of the initial access policy based on a comparison of the first number of unique paths in the first finite state diagram and the total number of possible client identifiers.

2. The system of claim 1, wherein the memory stores further instructions that, when executed by the one or more processors, cause the system to:
   receive and process access requests from clients;
   generate a list of client identifiers contained in the access requests;
   determine a regular expression that matches all client identifiers belonging to a list of client identifiers associated with a set of the access requests allowed by the system according to the initial access policy;
   construct, in the memory, a second finite state diagram corresponding to a modified access constraint that excludes client identifiers that are not matched by the regular expression from the initial access constraint, the second finite state diagram representing a finite state machine that, when provided with an access request allowed by the modified access constraint as an input, proceeds from a second initial state to a second particular state;
   determine a second number of unique paths in the second finite state diagram that proceed from the second initial state to the second particular state; and
   in response to determining that the second number of unique paths is less than the first number of unique paths by at least a predetermined threshold:
   provide a notification to the user via the user interface, the notification indicating that modified access constraint is less permissive than the initial access policy received from the user.

3. The system of claim 2, wherein the memory stores further instructions that, when executed by the one or more processors, cause the system to:
   generate a modified access policy corresponding to the modified access constraint according to a policy format definition that defines a format of the initial access policy.

4. The system of claim 3, wherein generating the modified access policy according to the policy format definition comprises:
   determining that a regular expression operator in the regular expression is an invalid operator according to the policy format definition;
   determining one or more valid operators according to the policy format definition that are equivalent to the invalid operator; and
   including a string matching condition in the modified access policy that matches strings matched by the regular expression, the string matching condition including the one or more valid operators in place of the invalid operator.

5. The system of claim 2, wherein determining the total number of possible client identifiers comprises determining a number of possible strings matched by a regular expression that matches all client identifiers belonging to the list of client identifiers.

6. A system comprising one or more processors and memory storing computer-executable instructions that, when executed by the one or more processors, cause the system to:
   receive an initial access policy from a user of the system, the initial access policy specifying, for a set of authorized clients, respective actions that the system may perform in response to access requests including a client identifier;
   transform the initial access policy into an initial access constraint having solutions corresponding to requests allowed by the initial access policy, the initial access constraint consisting of one or more predicate logic statements that describe respective results of applying the initial access policy to all possible access requests;
   determine, as a number of requests allowed by the initial access policy, a number of all distinct solutions to the initial access constraint;
   determine a total number of possible client identifiers; and
   output, via a user interface provided by the system, a notification indicating a degree of permissiveness of the initial access policy based on a comparison of the number of requests allowed by the initial access policy and the total number of possible client identifiers.

7. The system of claim 6 wherein determining the total number of possible client identifiers comprises:
   accessing log data indicating previous access requests of authorized clients previously processed by the system according to the initial access policy, the log data including client identifiers associated with the previous access requests; and
   generating a regular expression that matches each of the client identifiers associated with the previous access requests.

8. The system of claim 7 wherein generating the regular expression that matches each of the client identifiers associated with the previous requests further comprises restricting the regular expression to matching only client identifiers having a length less than or equal to a length of a longest client identifier included in the previous access requests.

9. The system of claim 7, wherein the memory stores further instructions that, when executed by the one or more processors, cause the system to:
generate a second regular expression that matches all client identifiers associated with previous allowed requests of the previous access requests allowed by the system according to the initial access policy;
generate a modified access constraint that further limits solutions to the initial constraint to access requests that include client identifiers matched by the second regular expression;
determine that a number of all distinct solutions to the modified access constraint is constraint is less than the number of distinct solutions to the initial access constraint by at least a predetermined threshold; and
generate a modified access policy that allows requests that form solutions to the modified access constraint in a format specified by a policy format definition that defines a human-readable format of the initial access policy.

10. The system of claim 9, wherein the memory stores further instructions that, when executed by the one or more processors, cause the system to:
output, via the user interface, a notification to the user that the modified access policy is less permissive than the initial access policy;
provide the modified access policy to the user in the human-readable format of the initial access policy;
replace the initial access policy with the modified access policy; and
process new access requests according to the modified access policy.

11. The system of claim 9,
wherein determining the number of all distinct solutions to the initial access constraint comprises:
constructing, in the memory, a first finite state diagram corresponding to initial the access constraint, the first finite state diagram representing a finite state machine that, when provided with an access request allowed by the initial access policy as an input, proceeds from a first initial state to a first particular state; and
determining a first number of unique paths in the first finite state diagram that proceed from the initial state to the particular state; and
wherein determining the number of all distinct solutions to the modified access constraint comprises:
constructing, in the memory, a second finite state diagram corresponding to the modified access constraint, the second finite state diagram representing a finite state machine that, when provided with an access request allowed by the modified access policy as an input, proceeds from a second initial state to a second particular state; and
determining a second number of unique paths in the second finite state diagram that proceed from the initial state to the particular state.

12. The system of claim 9, wherein the instructions, when executed by the processor to generate the modified access policy in the format specified by the policy format definition, cause the system to:
determine that an operation included in the second regular expression is an invalid operation according to the policy format definition;
determine one or more valid operations that implement the invalid operation in accordance with the policy definition format; and
include the one or more valid operations in the modified access policy in place of the invalid operation.

13. The system of claim 6 wherein transforming the initial access policy into the initial access constraint comprises:
accessing log data indicating previous access requests of authorized clients received by the system, the log data including client identifiers associated with the allowed access requests;
determining a maximum length of the client identifiers associated with the previous access requests; and
including a requirement in the initial access constraint that allows only client identifiers having a length that does not exceed the maximum length.

14. The system of claim 6, wherein determining the number of all distinct solutions to the initial access constraint comprises:
constructing, in the memory, a first finite state diagram corresponding to the initial access constraint, the first finite state diagram representing a finite state machine that, when provided with an access request allowed by the initial access policy as an input, proceeds from a first initial state to a first particular state; and
determining a first number of unique paths in the first finite state diagram that proceed from the initial state to the particular state.

15. A method comprising:
receiving an initial access policy, the initial access policy specifying respective actions that a computing system is allowed to perform in response to access requests received from clients;
transforming the initial access policy into an initial access constraint having solutions consisting of one or more predicate logic statements that are satisfied by access requests allowed by the initial access policy;
determining a first number of all possible access requests that satisfy the initial access constraint;
receiving data indicating characteristics of previous access requests;
determining a first number of all valid requests based on the characteristics of the previous access requests; and
outputting, via a user interface provided by the system, a notification indicating a degree of permissiveness of the initial access policy based on a comparison of the first number of all possible access requests and the first number of all valid requests.

16. The method of claim 15, wherein:
determining the first number of all possible requests comprises applying a machine learning algorithm to generate a first regular expression which matches client identifiers associated with the previous access requests; and
determining the first number of all valid access requests comprises determining all access requests having client identifiers matched by the first regular expression that also satisfy the initial access constraint.

17. The method of claim 16, further comprising generating a modified access policy by:
generating a modified access constraint that is only satisfied by access requests that satisfy the initial access constraint and also include client identifiers that are matched by the first regular expression;
determining that a second number of all valid access requests that satisfy the modified access constraint is fewer than the first number of all possible access requests by at least a predetermined threshold;

generating the modified access policy according to policy formatting instructions and the modified access constraint; and processing access requests according to the modified access policy in place of the initial access policy.

18. The method of claim 16, wherein determining the first number of all valid requests comprises, for each action of a plurality of actions allowed by the initial access policy, determining a number of client identifiers matched by the first regular expression that are allowed to perform that action according to the initial access policy.

19. The method of claim 18, the method further comprising:

generating a modified access policy by:
- for each action of the plurality of actions allowed by the initial access policy, using a machine learning algorithm to generate a corresponding additional regular expression that matches client identifiers previously allowed by the system to perform that action according to the initial access policy;
- generating a modified access constraint that is only satisfied by an access request to perform a requested action of the plurality of actions that:
  (1) satisfies the initial access constraint; and
  (2) includes a client identifier matched by the additional regular expression corresponding to the requested action;
- determining that a second number of all valid access requests that satisfy the modified access constraint is fewer than the first number of all valid access requests by at least a predetermined threshold;
- generating the modified access policy according to policy formatting instructions and the modified access constraint; and
- processing access requests according to the modified access policy in place of the initial access policy.

20. The method of claim 18, the method further comprising:

generating a modified access policy by:
- for each computing resource of a plurality of computing resources specified by the initial access policy, using a machine learning algorithm to generate a corresponding additional regular expression that matches client identifiers previously allowed by the system to perform actions directed to that computing resource according to the initial access policy;
- generating a modified access constraint that is only satisfied by an access request directed to a requested computing resource of the plurality of computing resources that:
  (1) satisfies the initial access constraint; and
  (2) includes a client identifier matched by the additional regular expression corresponding to the requested computing resource;
- determining that a second number of all valid access requests that satisfy the modified access constraint is fewer than the first number of all valid access requests by at least a predetermined threshold;
- generating the modified access policy according to policy formatting instructions and the modified access constraint; and
- processing access requests according to the modified access policy in place of the initial access policy.

* * * * *